(12) United States Patent
Zhang et al.

(10) Patent No.: US 8,830,228 B2
(45) Date of Patent: Sep. 9, 2014

(54) TECHNIQUES FOR ENABLING REMOTE MANAGEMENT OF SERVERS CONFIGURED WITH GRAPHICS PROCESSORS

(75) Inventors: Hao Zhang, Sunnyvale, CA (US); Eric Kai-hau Han, Sunnyvale, CA (US); Meher P. Malakapalli, Santa Clara, CA (US); Karthik Lakshminarayanan, Cupertino, CA (US); B. Anil Kumar, Saratoga, CA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 12/973,622

(22) Filed: Dec. 20, 2010

(65) Prior Publication Data

US 2012/0154375 A1    Jun. 21, 2012

(51) Int. Cl.
  *G06T 15/00*   (2011.01)
  *G06T 1/00*   (2006.01)
  *G06F 9/44*   (2006.01)
  *H04L 12/24*   (2006.01)

(52) U.S. Cl.
  CPC ............. *H04L 41/22* (2013.01); *H04L 41/0809* (2013.01); *G06F 9/4411* (2013.01)
  USPC .......................................... 345/419; 345/522

(58) Field of Classification Search
  CPC .... G06F 9/4411; H04L 41/0809; H04L 41/22
  See application file for complete search history.

(56) References Cited

U.S. PATENT DOCUMENTS

| | | | |
|---|---|---|---|
| 7,679,612 B2 | 3/2010 | Milirud et al. | |
| 7,941,803 B2 * | 5/2011 | Armstrong et al. | 718/1 |
| 8,214,849 B2 * | 7/2012 | Cooper | 719/323 |
| 2005/0240669 A1 * | 10/2005 | Khanna et al. | 709/225 |
| 2008/0278508 A1 | 11/2008 | Anderson et al. | |
| 2008/0282117 A1 | 11/2008 | Partani et al. | |
| 2009/0153561 A1 | 6/2009 | Sun et al. | |
| 2009/0260081 A1 | 10/2009 | Johnson et al. | |
| 2011/0050712 A1 * | 3/2011 | Jackson | 345/503 |
| 2012/0017111 A1 * | 1/2012 | Kumarasamy et al. | 714/4.1 |

OTHER PUBLICATIONS

ATI, "Graphics Drivers and WDDM", ATI Catalyst, Leading the way to Windows Vista, Retrieved on Oct. 29, 2010, 1-13.
Msdn "Windows Vista Display Driver Model", Microsoft Corporation, Windows Vista Technical Articles, Jul. 2006, 1-6.
Schechter, "The Role of the Windows Display Driver Model in the DWM", Apr. 2, 2006, 1-3.

* cited by examiner

*Primary Examiner* — Kee M Tung
*Assistant Examiner* — Frank Chen
(74) *Attorney, Agent, or Firm* — Jim Sfekas; Kate Drakos; Micky Minhas

(57) ABSTRACT

A technique for enabling the use of a baseboard management controller in a computer system configured to stream 3D graphical user interfaces to remote clients is described. In an exemplary configuration, a cap driver that is written to conform to a driver model that can interface with a 3D graphics application program interface can be loaded for use with the baseboard management controller instead of a legacy driver that was written to conform to a legacy driver model. This allows a control program to load a graphics driver that can interoperate with the 3D graphics application program interface. In addition to the foregoing, other aspects are described in the text of the summary and detailed description, the claims, and drawings.

19 Claims, 15 Drawing Sheets

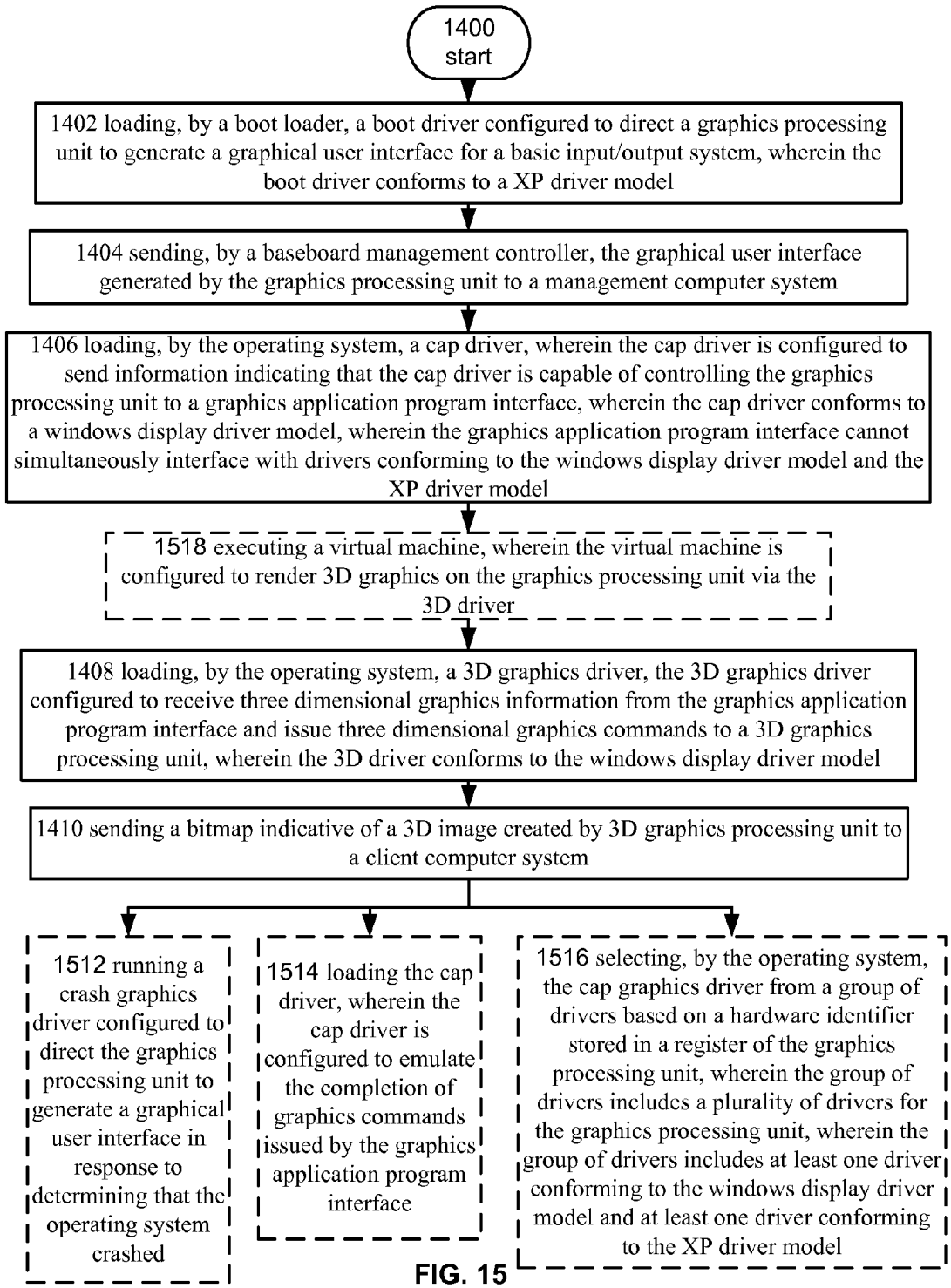

TECHNIQUES FOR ENABLING REMOTE MANAGEMENT OF SERVERS CONFIGURED WITH GRAPHICS PROCESSORS

BACKGROUND

Servers that process three dimensional graphics workloads are increasingly becoming a sought after commodity. For example, servers that host remote desktop sessions and/or virtual desktop sessions, i.e., sessions where a personal computer environment is run within a virtual machine and the user interface is sent to a remote computer, may include applications that generate computationally intense three-dimensional (3D) graphical user interfaces on 3D graphics processing units (GPUs). The resulting graphics generated by the 3D GPUs can then be streamed to a client over a network such as the Internet.

These servers are typically housed in a datacenter and are rarely physically interacted with after deployment. Instead, each server can have an installed baseboard management controller (BMC), which can be coupled to a network adaptor and include or have access to a low-end graphics processing unit. An administrator may connect to the BMC using keyboard, video, and mouse (KVM) switches and remotely view the server's video output. While other remoting techniques are available during the runtime operation of the server, the BMC is typically used during the period before the operating system is running and can work even if the operating system has crashed. For example, an administrator may use the BMC to remotely view the user interface of a basic input/output system (BIOS) to configure the BIOS and firmware of the server.

A problem exists in that the display drivers for these low-end graphics processing units used by BMCs are written according to a legacy display driver model that is incompatible with the display driver model used by the server to render 3D graphical user interfaces. Or put another way, the operating system cannot simultaneously run drivers that are compliant with the legacy driver model, e.g., the Windows XP® driver model (XPDM), and the driver model used by the server to render 3D graphical user interfaces, e.g., the Windows Display Driver Model (WDDM). This conflict causes the operating system to load drivers that were written according to the legacy driver model to load for both the graphics processing unit used by the BMC and the 3D graphics processing unit. This in turn causes the 3D graphics processing unit to operate at a reduced level of performance, e.g., without advanced 3D graphics processing capabilities. This problem leaves the administrator in an undesirable situation. To address this, the administrator can disable the BMC/legacy GPU within the BIOS so that the host 3D workloads work. Accordingly, techniques are desirable to overcome this problem.

SUMMARY

An exemplary embodiment includes a system. In this example, the system includes, but is not limited to a processor, a graphics processing unit, a 3D graphics processing unit, a baseboard management controller and a memory in communication with the processor when the computer system is operational. In this example, the memory can include, but is not limited to instructions that upon execution cause the computer system to load, prior to booting an operating system, a first driver configured to control the graphics processing unit, wherein the first driver is compliant with a first graphics driver model; load, during a boot sequence of the operating system, a second driver into the operating system, wherein the second driver is configured to simulate control of the graphics processing unit, wherein the second driver is compliant with a second graphics driver model, wherein the operating system cannot simultaneously run graphics drivers that are compliant with to the first graphics driver model and the second graphics driver model; load, during the boot sequence of the operating system, a third driver configured to issue three dimensional graphics commands to the 3D graphics processing unit into the operating system, wherein the third driver is compliant with the second graphics driver model; and send 3D images generated by the 3D graphics processing unit to a client. In addition to the foregoing, other techniques are described in the claims, the detailed description, and the figures.

Another exemplary embodiment includes a computer-readable storage medium. In this example, the computer-readable storage medium includes computer readable instructions that upon execution cause a processor to load, during a boot sequence of an operating system, a cap driver configured to simulate control of a first graphics processing unit coupled to a baseboard management controller configured to send graphics generated by the first graphics processing unit to a management computer, wherein the first driver is compliant with a windows display driver model; load, during the boot sequence of the operating system, a 3D display driver configured to issue three dimensional graphics commands to a second graphics processing unit, wherein the 3D windows display driver model driver is compliant with the windows display driver model; and run a crash driver in response to determining that the operating system crashed, a video graphics array driver configured to direct the first graphics processing unit to generate a graphical user interface of the computer system, wherein the video graphics array driver is compliant with a XP driver model. In addition to the foregoing, other techniques are described in the claims, the detailed description, and the figures.

Another exemplary embodiment includes a method. In this example, the method includes, but is not limited to loading, by a boot loader, a boot driver configured to direct a graphics processing unit to generate a graphical user interface for a basic input/output system, wherein the boot driver conforms to a XP driver model; sending, by a baseboard management controller, the graphical user interface generated by the graphics processing unit to a management computer system; loading, by the operating system, a cap driver, wherein the cap driver is configured to send information indicating that the cap driver is capable of controlling the graphics processing unit to a graphics application program interface, wherein the cap driver conforms to a windows display driver model, wherein the graphics application program interface cannot simultaneously interface with drivers conforming to the windows display driver model and the XP driver model; loading, by the operating system, a 3D graphics driver, the 3D graphics driver configured to receive three dimensional graphics information from the graphics application program interface and issue three dimensional graphics commands to a 3D graphics processing unit, wherein the 3D driver conforms to the windows display driver model; and sending a bitmap indicative of a 3D image created by 3D graphics processing unit to a client computer system. In addition to the foregoing, other techniques are described in the claims, the detailed description, and the figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/ or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 15 illustrates the operational procedure of FIG. 14 including additional operations.

DETAILED DESCRIPTION

Figure 1:
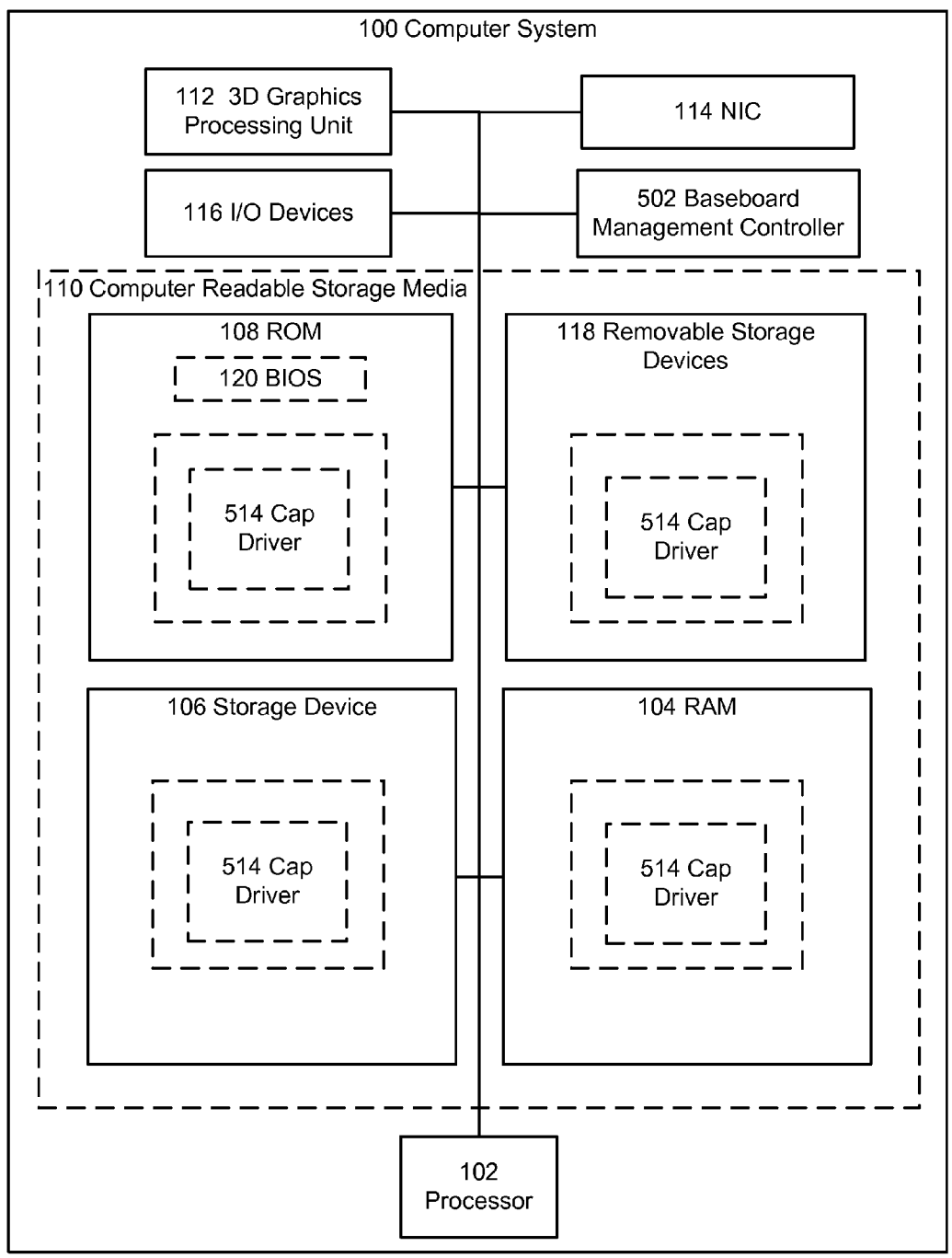
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus models. In example embodiments the computer-readable storage media 110 can include for example, random access memory (RAM) 104, storage device 106, e.g., electromechanical hard drive, solid state hard drive, etc., Boot ROM 108, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

Computer-readable storage media 110 can provide non volatile and volatile storage of processor executable instructions, data structures, program modules and other data for the computer 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs. As shown by the figure, and described in more detail in the following paragraphs, cap driver 514 can be used to allow a graphics processing unit used by baseboard management controller 502 to be enabled and an operating system to load a 3D graphics driver useable to generate advanced 3D graphical user interfaces. Cap driver 514 is illustrated in dashed lines, which indicate that cap driver 514 can be optionally stored in one or more of the identified forms of computer-readable storage media 110.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a 3D graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
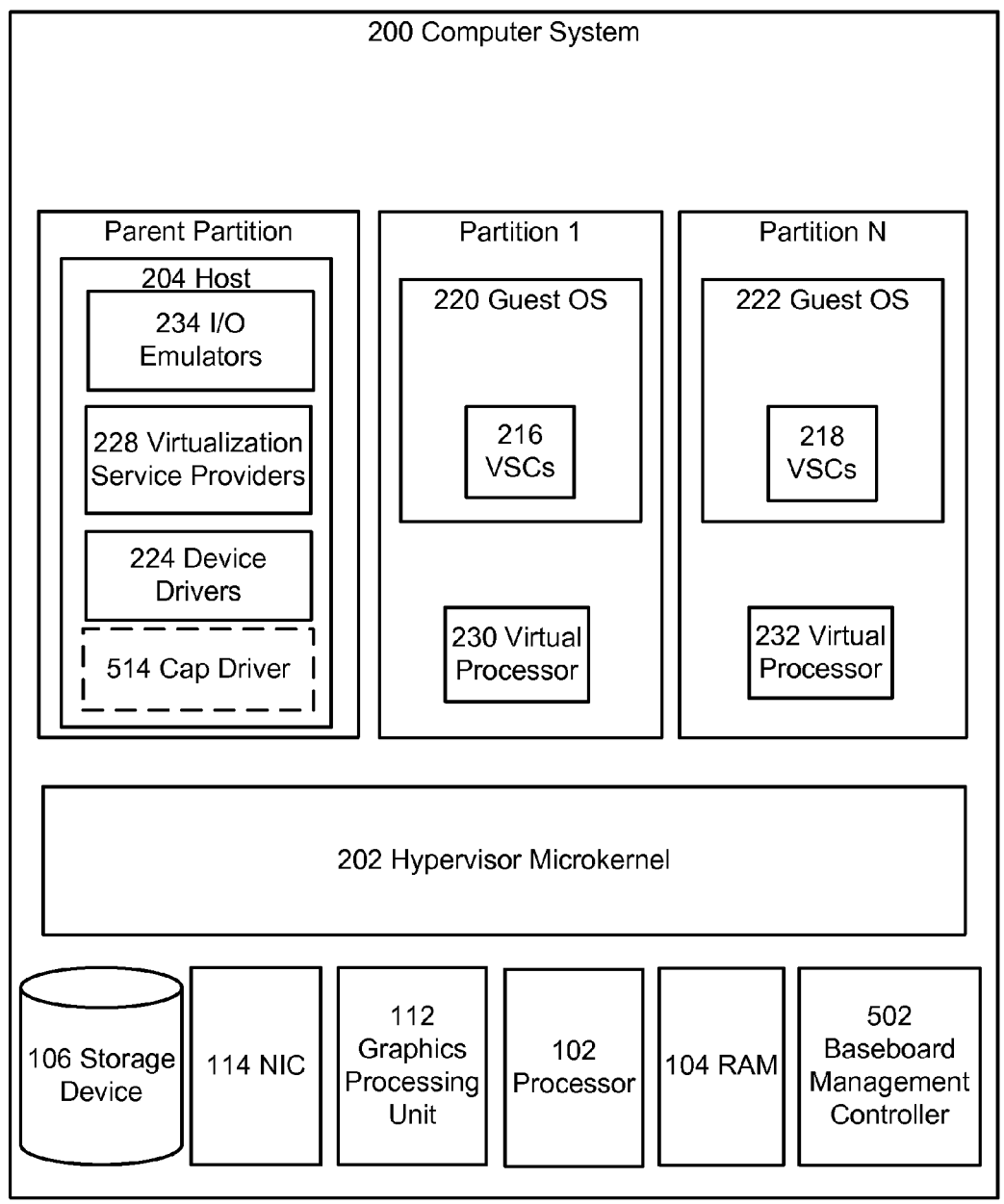
FIG. 2 depicts a high-level block diagram of a virtual machine server.

Turning to FIG. 2, illustrated is an exemplary virtualization platform that can be used to generate virtual machines. In this embodiment, hypervisor microkernel 202 can be configured to control and arbitrate access to the hardware of computer system 200. Hypervisor microkernel 202 can generate execution environments called partitions such as the parent partition and child partitions 1 through N (where N is an integer greater than 1). Here, a child partition is the basic unit of isolation supported by hypervisor microkernel 202. Or put another way, hypervisor microkernel 202 can isolate processes thereby preventing processes in one partition from accessing another partition's resources. Each child partition can be mapped to a set of hardware resources, e.g., memory, devices, processor cycles, etc., that is under control of hypervisor microkernel 202. Hypervisor microkernel 202 can be embodied in various forms, e.g., it can be a stand-alone software product, a part of an operating system, embedded within firmware of the motherboard, embedded within one or more specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the virtual machine's view of system memory is restricted to only the memory allocated to it by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

In the instant that a guest operating system is running within the virtual machine, it may virtualize guest physical memory thereby adding another lawyer of translations. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In an instance where a guest OS is running within a virtual machine, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) configured to provide resources to guest operating systems executing in the child partitions 1-N by using virtualization service providers 228 (VSPs) and/or emulators 234. VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be microkernel hypervisor 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate a device than it does to pass messages between VSPs and VSCs. For example, the hundreds of actions on memory mapped to registers required in order to write a value to disk via the emulation path may be reduced to a single message passed from a VSC to a VSP in the virtualization path.

Eventually the emulators 234 or VSPs 228 may send commands to hardware devices via device drivers 224. The device drivers 224 can issue commands to hardware and signal the completion or failure of the commands to the emulators 234 or VSPs 228. The emulators 234 or VSPs 228 can send the completion or failure of the commands to the associated virtual machine. Cap driver 514, described in more detail in the following paragraphs, may also run in host 204.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific model. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
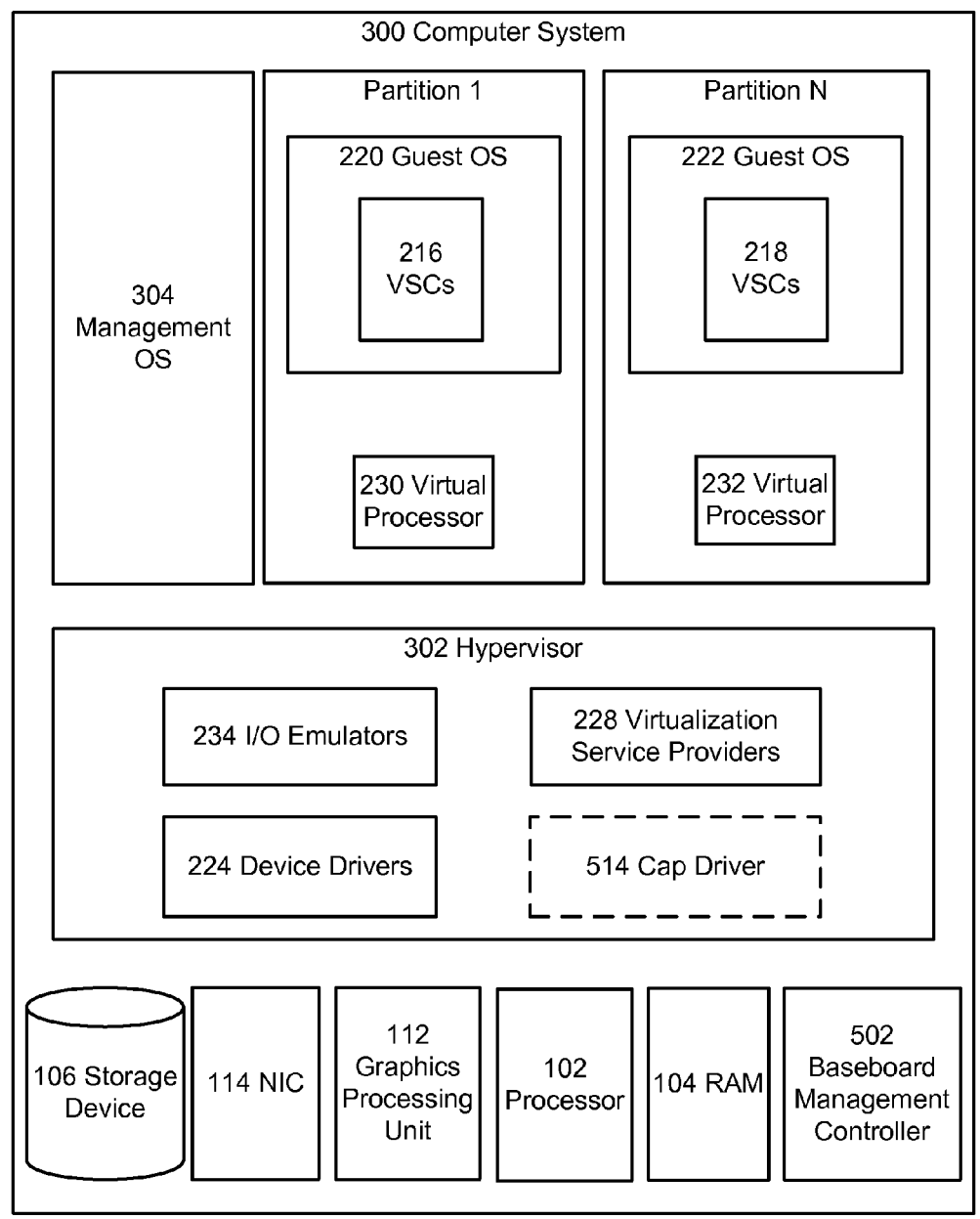
FIG. 3 depicts a high-level block diagram of a virtual machine server.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228, device drivers 224, and cap driver 514 while management operating system 304 may contain, for example, configuration utilities used to configure hypervisor 302. In this model, hypervisor 302 can perform the same or similar functions as hypervisor microkernel 202 of FIG. 2; however, in this model hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
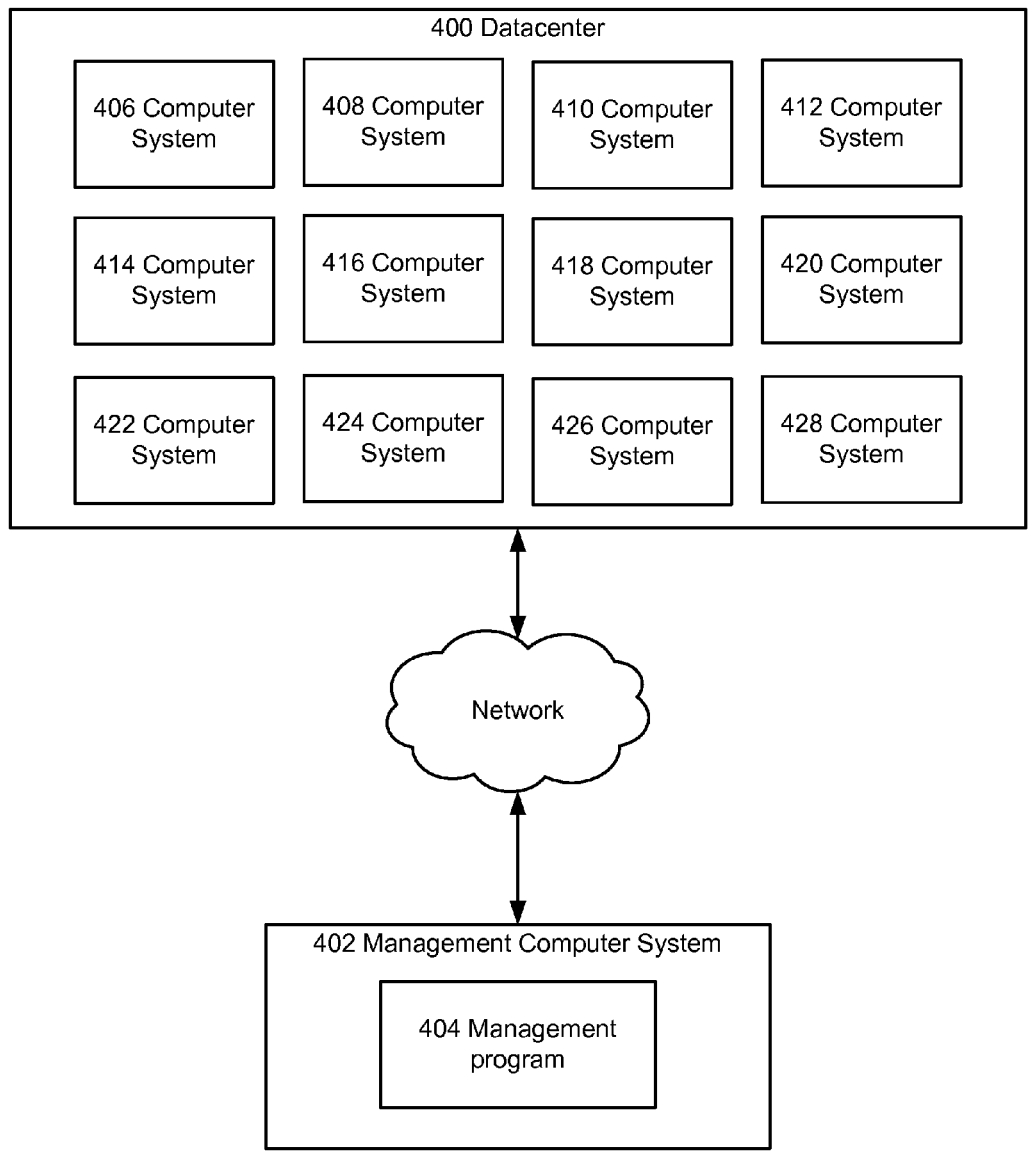
FIG. 4 depicts a high-level block diagram of a datacenter.

The computer systems configured to allow for 3D remoting in servers that include baseboard management controllers are typically organized into a datacenter and remotely controlled by administrators. Turning to FIG. 4, it illustrates a high-level block diagram representing a datacenter 400. As shown by the figure, datacenter 400 includes a plurality of computer systems (406-428), each of which can include some or all of the hardware/software described above with respect to FIG. 1-3. An administrator can use management program 404 running on management computer system 402 to access datacenter 400 and communicate with any of the computer systems housed therein. For example, management program 404 can include a menu that allows an administrator to select a particular computer, e.g., computer system 406, to connect to. Once connected, the administrator can perform a number of operations such as boot computer system 406, view a graphical user interface of computer system 406, configure the BIOS settings for a computer system, and take control of computer system 406 by sending information indicative of keyboard kicks and/or mouse events to computer system 406.

In the instance that an administrator wishes to configure the computer system to enable advanced 3D capabilities of a 3D GPU during runtime of an operating system/virtualization platform (herein referred to as a "control program" for ease of use) view a computer system during its boot sequence and/or after it crashes, cap driver 514 can be installed and loaded by an the control program running on computer system 406 instead of a basic graphics driver. As will be described in more detail in the following paragraphs, cap driver 514 can be used to allow both baseboard management controller 502 to be used prior to the control program being booted and/or after it crashes and a 3D optimized graphics driver to be loaded by an control program.

In an exemplary embodiment, cap driver 514 may be incapable of actually controlling the low-end graphics processing unit coupled to or integrated within BMC 502. That is, cap driver 514 may not be capable of translating API constructs to GPU commands and issuing them to the graphics processing unit. Instead, cap driver 514 can be configured to simulate the behavior of a driver that can control the low-end graphics processing unit. For example, cap driver 514 can implement a device driver interface (DDI) that is capable of reporting to an 3D graphics application program interface (API) such as DirectX® that it can control the hardware functions of the low-end graphics processing unit. Briefly, the 3D graphics API can enable applications (and the control program, e.g., an operating system) to produce 3D graphical user interfaces. For example, the 3D graphics API provides an abstraction layer between a graphics application, e.g., a videogame, and a driver (in this case cap driver 514). The 3D graphics API provides a low-level interface to graphics processing unit interfaces exposed by a driver (such as cap driver 514) and it provides a standardized library of 3D graphics commands that can be called by applications. This configuration frees software developers from having to understand the particularities of every graphics driver.

In this example, cap driver 514 can include interfaces that enable the 3D graphics API to report that it can communicate and control the low-end graphics processing unit. Cap driver 514 can also be configured to simulate responses to requests issued by the 3D graphics API during an initialization phase. For example, cap driver 514 may include functions that acknowledge requests it receives from the 3D graphics API and simply report back the completion of the request without actually sending the request to the low-end graphics processing unit. Consequently, in instances where cap driver 514 cannot control the low-end graphics processing unit, baseboard management controller 502 may not be usable to remotely interface with computer system 406. Or put another way, baseboard management controller 502 may not be useable during the runtime of the control program to view the display of computer system 406.

Figure 5:
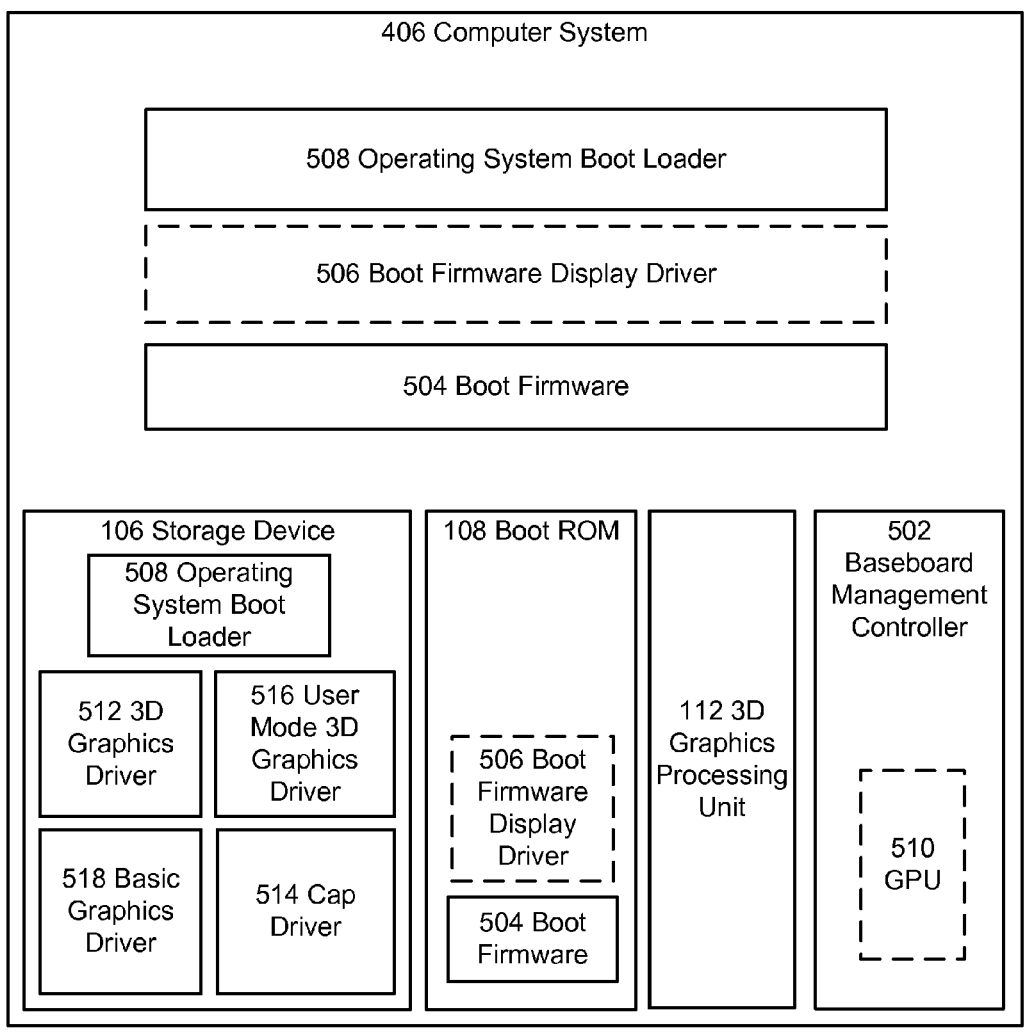
FIG. 5 depicts a high-level block diagram of a computer system during a first stage of a boot sequence.

Turning now to FIG. 5, it illustrates a computer system, e.g., computer system 406, during a boot sequence that causes cap driver 514 to load rather than basic display driver 518 (which is coded according to the legacy driver model). Computer system 406 can be booted remotely by an administrator by sending a signal from management computer system 402 BMC 502 via the network. Baseboard management controller 502 can receive a signal via a network interface card and cause computer system 406 to power on and enter a boot sequence. After computer system 406 is powered, a processor such as processor 102 can run instructions indicative of boot firmware 504 from boot ROM 108. Boot ROM 108 can run and load boot firmware 504 and a boot firmware display driver 506, e.g., a video graphics array (VGA) compliant driver that can be used to generate a graphical user interface that allow a user to interface with boot firmware 504. In a specific example, boot firmware 504 could be a basic input/output system (BIOS) or a program that conforms to the Extensible Firmware Interface (EFI) specification.

Boot firmware 504 can execute a power on self test (POST) that tests computer system 406 and draw a graphical user interface that can be captured by baseboard management controller 502 and sent to management computer system 402. At this point in the boot sequence, the graphical user interface may simply show a black screen with white text that indicates the results of the POST test, information identifying the developer of boot firmware 504, information that identifies a key that can be pressed to enter a configuration utility, etc. At this point, an administrator could press a key, e.g., F8, on management computer 402 and a signal can be sent to BMC 502 that causes a signal to be generated indicative of the key press. Boot firmware 504 can start a configuration utility that allows the administrator to remotely configure computer system 406 before the operating system boots.

Eventually, boot firmware 504 will receive an instruction to start a control program and search a predetermined spot on, for example, storage device 106 for a control program boot loader, i.e., operating system boot loader 508, e.g., a program like NT loader or winload.exe for the Microsoft® operating systems, a program named GNU GRUB for Unix-like operating systems, a program like syslinux for Linux based operating systems, etc. Processor 102 can run operating system boot loader 508, which can cause boot firmware 504 to exit and the memory containing boot firmware 504 and boot firmware display driver 506 to be freed so that information for the control program, e.g., an operating system, or even the operating system itself can be written into it. This causes boot firmware display driver 506 to stop and the graphical user interface of computer system 406 to go black until another device driver is loaded.

Figure 6:
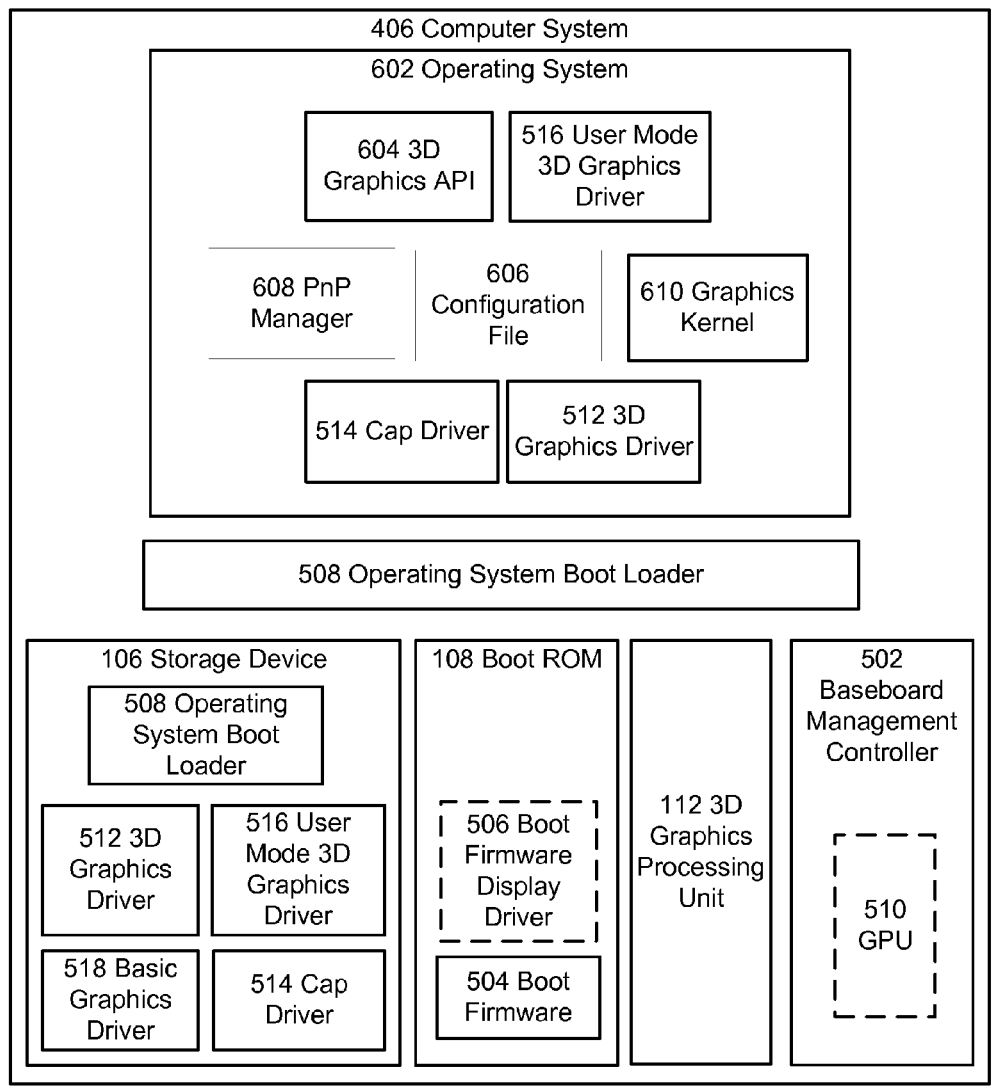
FIG. 6 depicts a high-level block diagram of a computer system during a second stage of a boot sequence.

Turning now to FIG. 6, operating system boot loader 508 can continue to load components of an operating system, e.g. operating system 602, into memory until the kernel of the operating system and any critical drivers are loaded. At this point, operating system 602 can take over the boot process; start loading software modules; and causes operating system boot loader 508 to exit. Eventually, plug-and-play manager 608 and configuration file 606, e.g., a registry, is loaded into memory. Plug-and-play manager 608 is configured to enumerate each hardware device attached to the mainboard and load device drivers operable to manage the hardware. For example, in one embodiment, plug-and-play manager 608 can read the hardware identifiers from registers of hardware devices and search configuration file 606 for the hardware identifiers and a location of a driver set to control the hardware device. GPU 510 and 3D GPU 112 are two of the hardware devices that plug-and-play manager 608 will detect. When plug-and-play manager 608 detects GPU 510, it will determine that configuration file 606 includes information that declares that cap driver 514 runs GPU 510 and load cap driver 514 into memory. Consequently, plug-and-play manager 608 will also load 3D GPU driver 512. Since both drivers conform to the graphics driver model used by computer system 406 to generate 3D graphical user interfaces, 3D graphics API 604, which is used to expose advanced 3D hardware capabilities of graphics drivers to applications, can initialize as well as graphics kernel 610, which is a software module that schedules the execution of 3D workloads on graphics processing units. In this example, user mode 3D graphics driver 516, which is a user mode component that works in conjunction with 3D graphics driver 512 to generate 3D graphical user interfaces, can also be loaded. For example, user mode 3D graphics driver 516 can generate API constructs, e.g., primitives and commands, and store them in vertex buffers and 3D graphics driver 512 can append the vertex buffers to a queue of graphics kernel 610.

Figure 7:
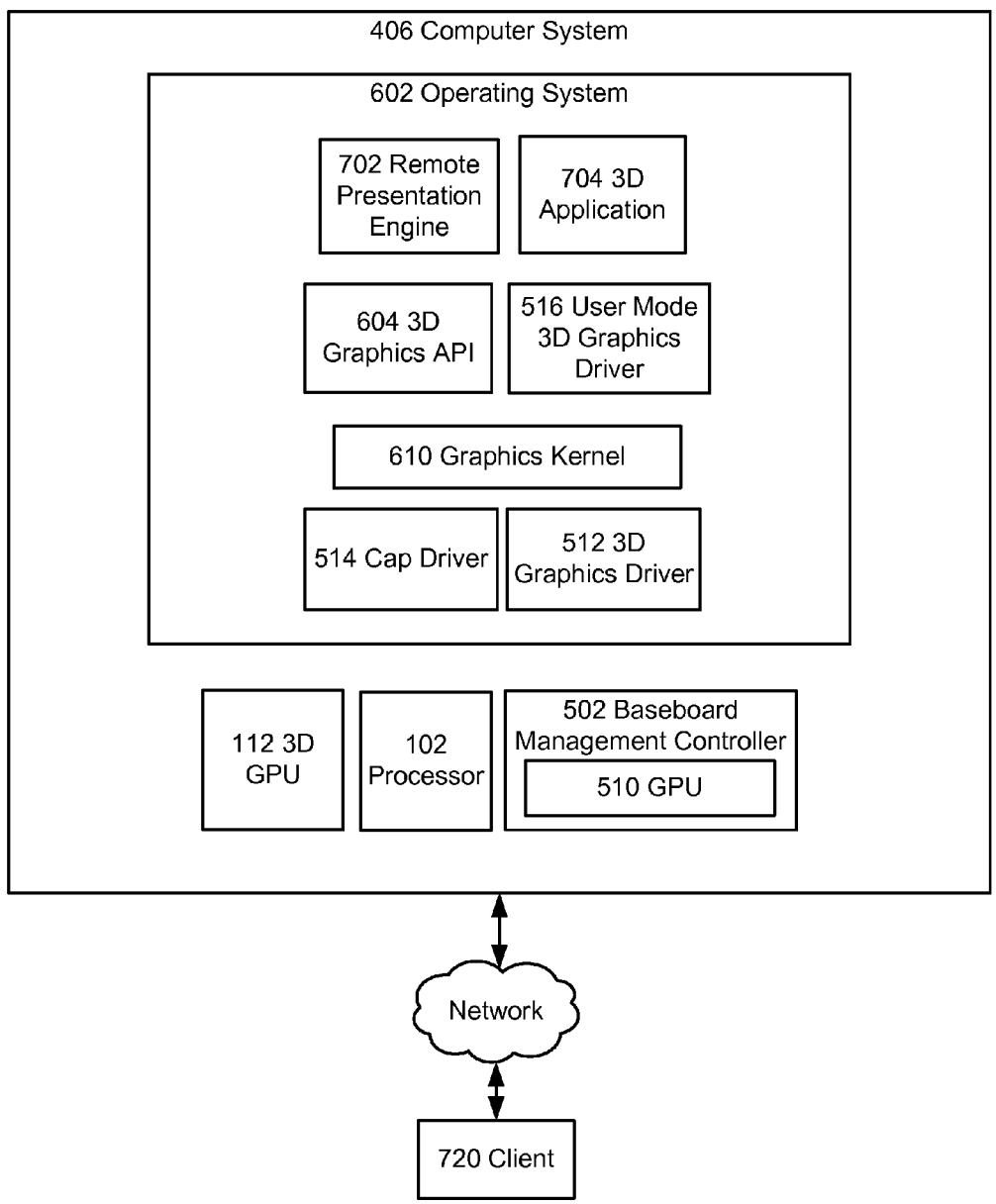
FIG. 7 illustrates a high-level block diagram of a computer system configured to stream 3D graphical users interfaces to a client.

Turning now to FIG. 7, it shows a specific example of a control program, e.g., operating system 602, running on computer system 406. After operating system 602 has loaded, a session can be started and operating system 602 can launch user mode applications such as remote presentation engine 702, which allows remote computer systems such as client 720 to connect to computer system 406. In addition, 3D application 704, e.g., a graphical user interface for the operating system can also be loaded.

Figure 8:
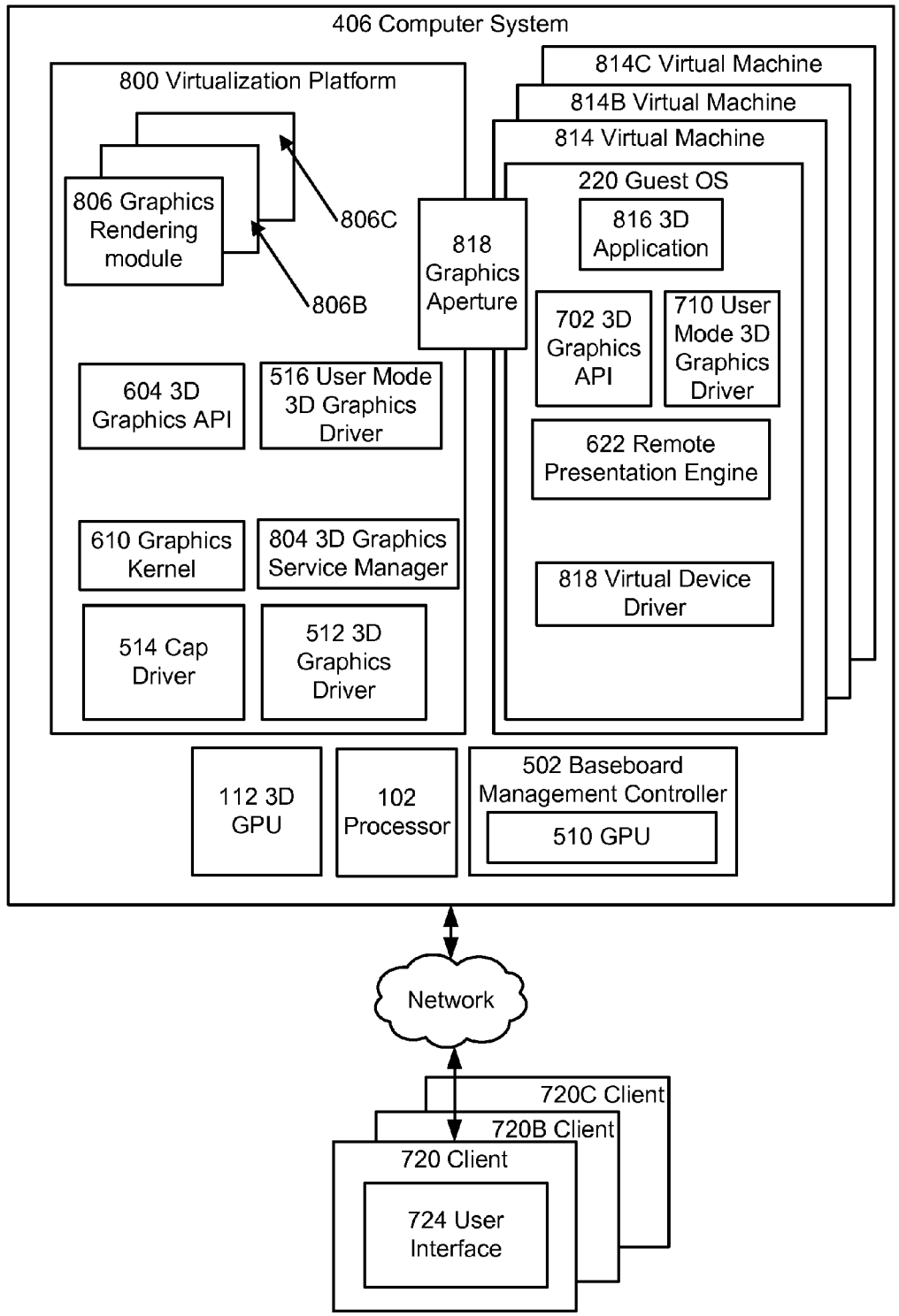
FIG. 8 illustrates a high-level block diagram of a computer system configured to host 3D enabled virtual desktop sessions.

Continuing with the general description of the figures, and referring to FIG. 8, it shows an instance where the control program is a virtualization platform, e.g., a host operating system with a hypervisor. The functionality described in the following sections as "within" virtualization platform 800 can be implemented in one or more of the elements depicted in FIG. 2 or FIG. 3. For example, cap driver 514 can be implemented in a host 204 of FIG. 2. In a more specific example, cap driver 514 can be implemented in a host operating system running in a parent partition.

Virtualization platform 800 can configure itself to use 3D graphics API 604 to generate 3D graphical user interfaces for virtual machines (814, 814B, and 814C) and stream the 3D graphical user interfaces to clients such as client 820, 820B, and/or 820C. Clients 820, 820B, and/or 820C can include computer system having components similar to those illustrated in FIG. 1, mobile devices, and/or thin-clients. For example, the thin-client may have commodity hardware and a monolithic web-browser configured to manage the hardware, user input and output, and connect to the Internet. In this example, the thin-client may also include user interface 824, e.g., a display and user input device such as a mouse.

3D graphics service manager 804 can be loaded by virtualization platform 800 to enable 3D graphical user interfaces for virtual machines. 3D graphics service manager 804 can execute and be configured to receive signals when a virtual desktop session connection is received. When a virtual machine is started, 3D graphics service manager 804 can load a graphics rendering module for it and cause components that enable guest operating system 220 to render 3D graphics. Briefly, a graphics rendering module can render to 3D GPU 112 on behalf of its associated virtual machine. In the illustrated example, graphics rendering module 806 corresponds to virtual machine 814, whereas graphics rendering modules 806B and 806C correspond to virtual machines 714B and 714C respectively. The graphical user interface for a virtual machine can be fed from the virtual machine to a rendering module, which is treated by virtualization platform 800 as a 3D process generating a graphical user interface.

Continuing the description of FIG. 8, virtualization platform 800 can cause 3D graphics modules to spawn in guest operating system 220 such as Virtual device driver 818. As guest operating system 220 starts, a plug-in-play module can execute and can query memory addresses mapped to IO. The hypervisor, e.g., hypervisor 202 of FIG. 2, can intercept the read and respond with a device identifier that causes plug-in-play module running within guest OS 220 to load Virtual device driver 818. Virtual device driver 818 can establish a graphics buffer, e.g., a shared library, a pipe, or graphics aperture 818 between virtual machine 814 and virtualization platform 800. In this example, Virtual device driver 818 can be configured to write DMA buffers including API constructs to graphics aperture 818 and graphics aperture 818 can route the DMA buffers to the graphics rendering module associated with the virtual machine.

In an exemplary embodiment, Virtual device driver 818 can appear as a device driver for a 3D capable graphics processing unit to guest operating system 220, thereby causing guest operating system 220 to configure itself to support 3D graphics, e.g., by loading an instance of 3D graphics API 802, which can be functionally the same as 3D graphics API 604. Virtual device driver 818 can be configured to interface with API 802, which enables 3D application 816 to produce 3D graphics.

When operating, 3D graphics API 802 can generate primitives, e.g., the fundamental geometric shapes used in computer graphics as building blocks for other shapes represented as vertices and constants, and store them in a plurality of vertex buffers, e.g., direct memory access (DMA) buffers. Virtual device driver 818 can send the primitives to graphics rendering module 806 via graphics aperture 818 and graphics rendering module 806 can store the buffers in memory. When the 3D graphics API 802 issues a draw command, virtual device driver 818 can place the command and additional data in the DMA buffers; package them into one or more GPU tokens; and send the GPU tokens to graphics rendering module 806 via graphics aperture 818.

Graphics rendering module 806 can receive the tokens; extract the command from the DMA buffer and issue the command to graphics kernel 610. Graphics kernel 610, which can be configured to schedule execution on the graphics processing units within computer system 406, can receive the commands and the addresses of the DMA buffers and determine when to issue the commands to 3D graphics driver 512. When the primitives from the various DMA buffers are to be rendered, graphics kernel 610 can send draw commands to 3D graphics driver 512, which can execute on a processor and can direct 3D graphics processing unit 112 to execute the commands and process the data in the DMA buffers.

Three-dimensional graphics processing unit 112 can execute and generate a bitmap, e.g., an array of pixel values, indicative of an image frame in memory. Graphics rendering module 806 can capture the bitmap and pass the bitmap to a compression module and then to remote presentation engine 622 via graphics aperture 818. Remote presentation engine 622 can send the bitmap to a client, e.g., client 820 via one or more packets of information.

Figure 9:
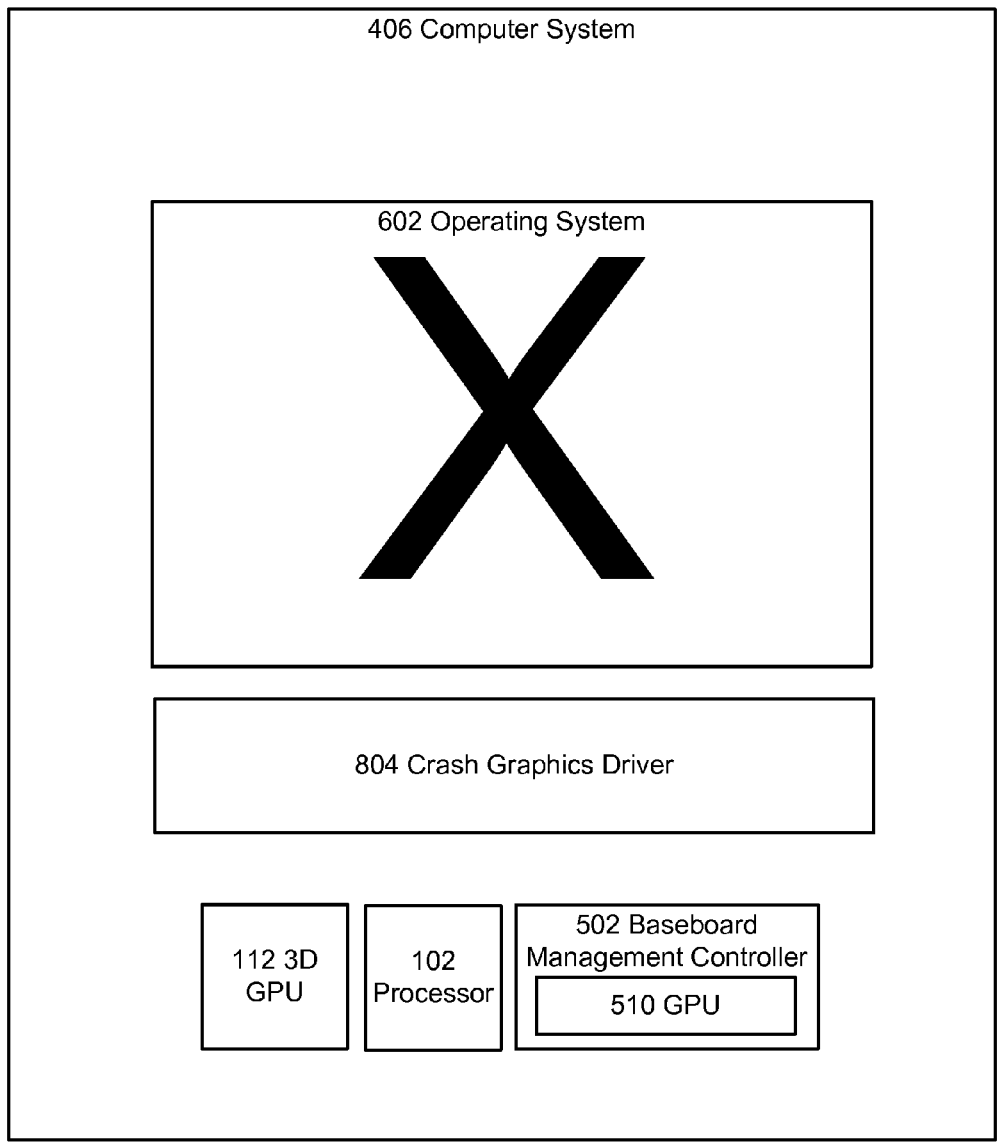
FIG. 9 illustrates a high-level block diagram of a computer system with a crashed operating system in memory.

Referring now to FIG. 9, it shows computer system 406 after operating system 602 crashes (signified by the large "X" within operating system 602). When operating system 602 boots it can load a crash stack that includes a monolithic crash stack graphics driver 904, which typically conforms to the legacy driver model and pre-initialize it to draw any error codes to screen in the event of a crash. When operating system 602 crashes, there is no operating system conflict between legacy drivers and 3D optimized drivers. Thus, the crash stack graphics driver 904 can run and draw to any detected error codes to memory. GPU 510 can be controlled by crash stack graphics driver 904 and it can capture the generated graphical user interface and send it to management computer system 402.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 10:
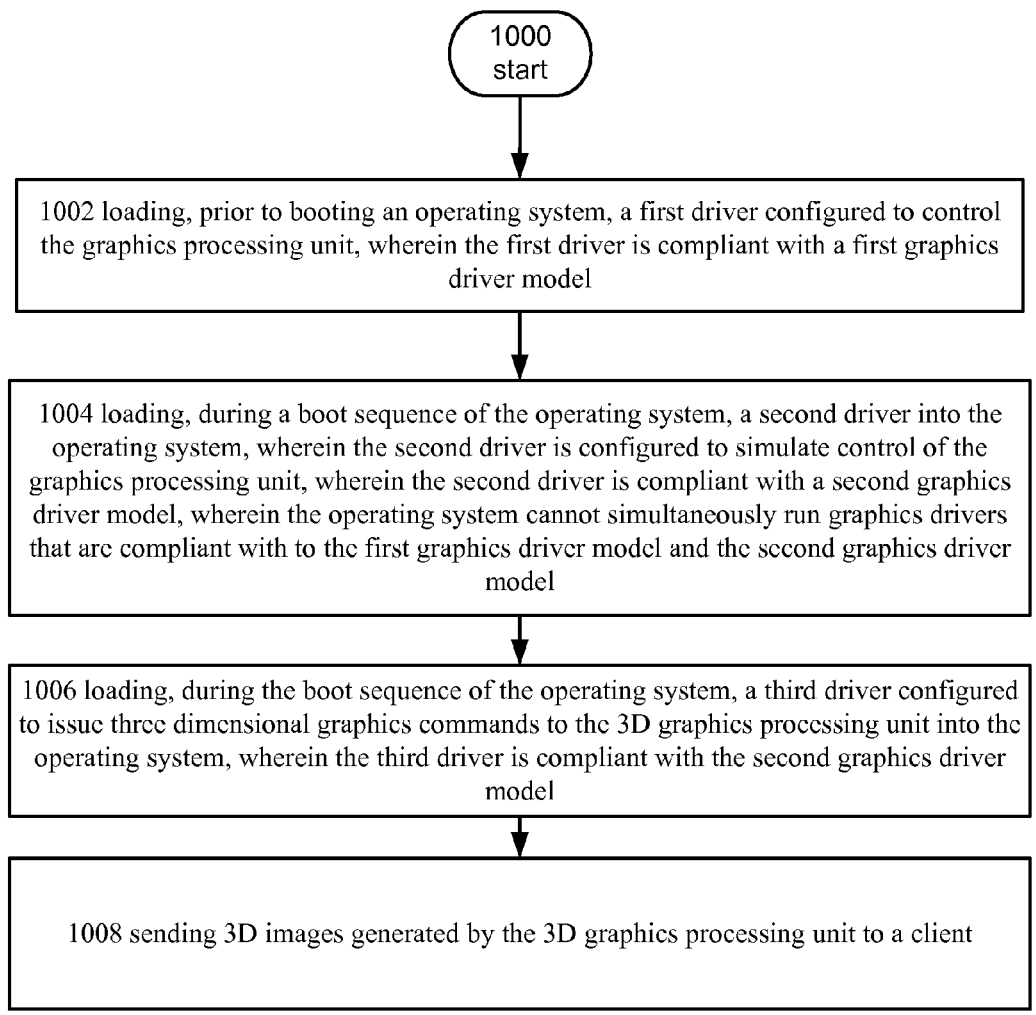
FIG. 10 depicts an operational procedure.

Turning to FIG. 10, it illustrates an operational procedure. Operation 1000 begins the operational procedure and operation 1002 shows loading, prior to booting an operating system, a first driver configured to control the graphics processing unit, wherein the first driver is compliant with a first graphics driver model. For example, and referring to FIG. 5, before a control program is loaded, e.g., operating system 602, processor 102 can execute instructions that cause boot firmware display driver 506 to be loaded into memory, e.g., random access memory. Boot firmware display driver 506 can be compliant with a first driver model, e.g., a legacy driver model, and can issue commands to GPU 510 and/or 3D GPU 112 to draw a graphical user interface indicative of boot firmware 504. GPU 510 can generate the graphical user interface and baseboard management controller 502 can send it to management computer system 402 of FIG. 4.

Referring briefly back to FIG. 10, the next operation illustrated is operation 1004, which illustrates loading, during a boot sequence of the operating system, a second driver into the operating system, wherein the second driver is configured to simulate control of the graphics processing unit, wherein the second driver is compliant with a second graphics driver model, wherein the operating system cannot simultaneously run graphics drivers that are compliant with to the first graphics driver model and the second graphics driver model. Referring back to FIG. 5 for context, boot firmware 504 may detect an operating system boot loader 508 stored in storage, e.g., in storage device 106 or any other storage device, and load it into random access memory. At this point, boot firmware 504 can schedule operating system boot loader 508 to run and exit. A side effect of this process is that the memory containing boot firmware 504 and boot firmware display driver 506 is freed so that other data can be written in the memory addresses these two modules occupied.

Turning now to FIG. 6, operating system boot loader 508 can start loading certain drivers into memory and eventually load a kernel for an operating system, e.g., operating system 602. For example, the drivers loaded at this stage may be for a file system or other drivers required by operating system 602 before the remainder of the operating system can be loaded. After these drivers are loaded, operating system boot loader 508 can load other components of operating system 602 such as a kernel, a hardware abstraction layer, configuration file 606, e.g., a registry, etc., and eventually plug-and-play manager 608.

Plug-and-play manager 608 can be executed by processor 102 and the hardware attached to the mainboard can be enumerated. Plug-and-play manager 608 can search configuration file 606 for drivers that correspond to the enumerated hardware. In an exemplary embodiment, plug-and-play manager 608 can detect the presence of graphics processing unit 510 and look in configuration file 606 for the driver that corresponds to it. In this example, plug-and-play manager 608 may detect cap driver 514 and basic graphics driver 518 as two drivers that can work with GPU 510. Configuration file 606, however, can include information that explicitly directs plug-and-play manager 608 to load cap driver 514, which is designed to conform to a driver model optimized to operate with 3D graphics API 604, rather than base graphics driver 518, which may be written to conform to a legacy driver model.

Returning to FIG. 10 and turning to operation 1006, it shows loading, during the boot sequence of the operating system, a third driver configured to issue three dimensional graphics commands to the 3D graphics processing unit into the operating system, wherein the third driver is compliant with the second graphics driver model. Turning back to FIG. 6 for context, plug-and-play manager 608 can continue loading drivers for hardware attached to the mainboard of computer system 406 and also load 3D graphics driver 512, which is optimized for use with 3D graphics API 604. For example, plug-and-play manager 608 can check a configuration file and find information indicating that 3D graphics driver 512 and its corresponding user mode 3D graphics driver 516 are used for 3D GPU 112 and load them from storage device 106 into operating system 602.

Turning again back to FIG. 10, operation 1008 shows sending 3D images generated by the 3D graphics processing unit to a client. For example, and referring to FIG. 6, after operating system 602 is up and running, a 3D graphical user interface created by 3D GPU 112 can be sent to a client such as client 620. For example, 3D application 704, e.g., a videogame, can be executed by operating system 602 and it can issue commands to 3D graphics API 604. 3D graphics API 604 can interface with user mode 3D graphics driver 516 and can generate DMA buffers of primitives and send them to 3D graphics driver 512, which can append the DMA buffers to a queue. Graphics kernel 610 can issue an execute command and 3D graphics driver 512 can send the DMA buffers to 3D GPU 112. A bitmap can be generated by 3D GPU 112, which can be sent to the client 620.

Figure 11:
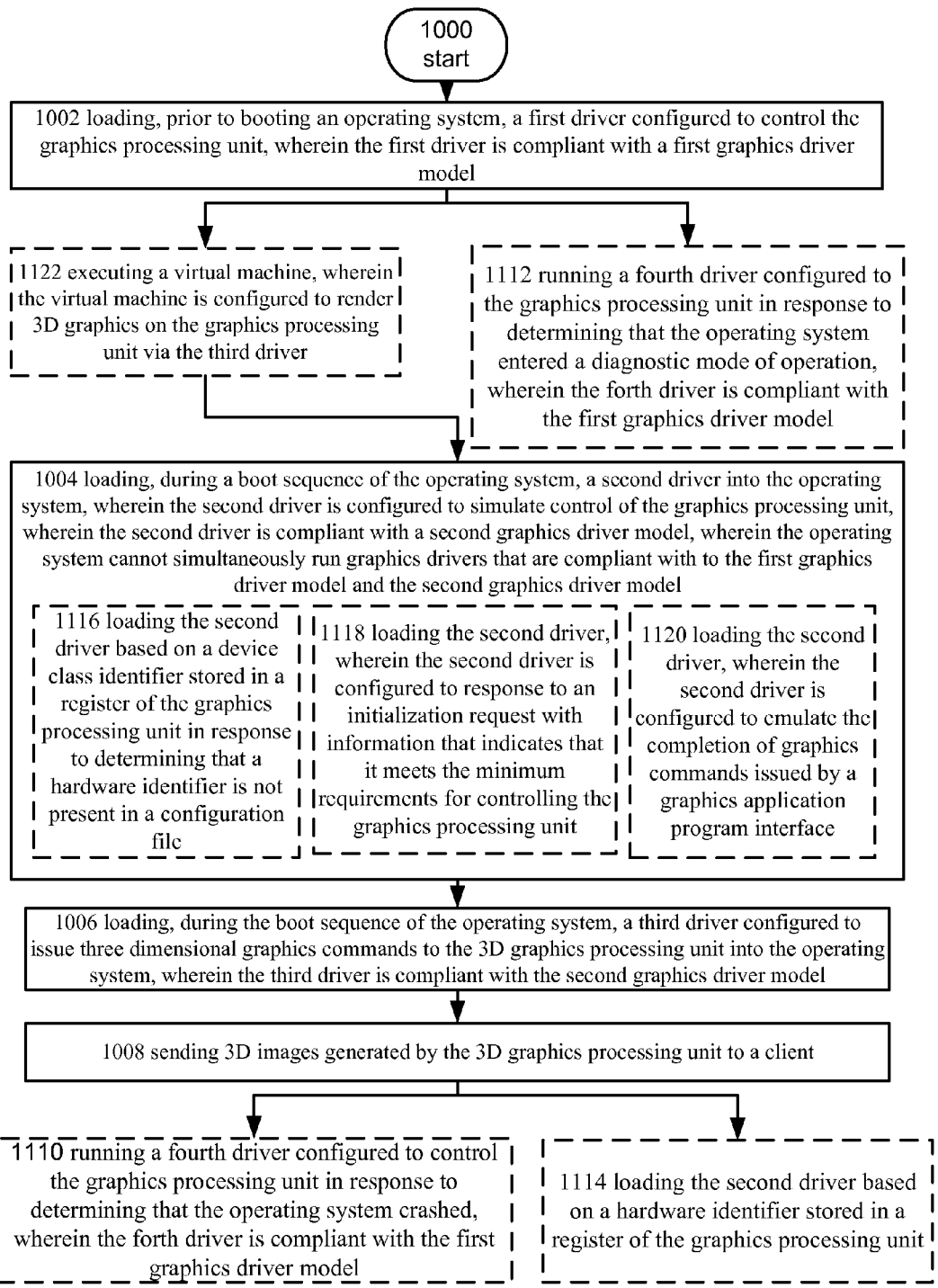
FIG. 11 illustrates the operational procedure of FIG. 10 including additional operations.

Referring now to FIG. 11, it shows an operational procedure including the operations described above with respect to FIG. 10 and additional operations 1110-1122. As shown by the figure, the additional operations provide more detail and supplement the operations described above. Operation 1110 shows that in an embodiment the computer system can include circuitry for running a fourth driver configured to control the graphics processing unit in response to determining that the operating system crashed, wherein the forth driver is compliant with the first graphics driver model. For example, and referring to FIG. 9, operating system 602 may crash and crash graphics driver 904 may execute on processor 102 and send commands to GPU 112 and GPU 510 to direct it to generate a graphical user interface that includes text showing an error code and/or information explaining that the operating system has encountered an error and has shut down. A specific example of this may include generating a graphical user interface that includes a "Blue Screen of Death." In this exemplary embodiment, the crash graphics driver 904 can be compliant with the legacy driver model because it is less complicated and rich 3D graphics are unnecessary in the event that crash graphics driver 904 is running Baseboard management controller 502 can be configured to capture the graphical user interface generated by GPU 510 and send it to management computer system 402 via a network interface card.

Referring back to FIG. 11, operation 1112 shows that the computer system can include circuitry for running a fourth driver configured to the graphics processing unit in response to determining that the operating system entered a diagnostic mode of operation, wherein the forth driver is compliant with the first graphics driver model. As shown by the figure, in the instance that this operation is performed, a diagnostic mode of operation for operating system 602 may have been entered rather than the regular mode (not illustrated). Diagnostic mode is typically used to identify problems and makes this process easier by configuring the operating system to have reduced functionality. One of the features disabled in diagnostic mode could be the 3D graphics API 604. Consequently, when operating system 602 is configuring itself to run in diagnostic mode, plug-and-play manager 608 may be configured to load basic display driver 518 instead of 3D graphics driver 512. For example, configuration file 606 could include information that indicates that basic driver 518 is to be loaded in diagnostic mode rather than 3D graphics driver 512. Basic graphics driver 518 can be used by GPU 510 to render a graphical user interface that can be captured by baseboard management controller 502 and send it to management computer system 602. In this example, since the only graphics drivers that are loaded in this mode conform to the legacy driver model, no operating system conflict exists and Continuing with the description of FIG. 11, operation 1114 shows that in an exemplary embodiment, the computer system can include circuitry for loading the second driver based on a hardware identifier stored in a register of the graphics processing unit. For example, plug-and-play manager 608 can be configured to enumerate devices attached to the mainboard and check registers of GPU 510 to obtain the hardware device identifier. For example, each hardware device can include standardized registers that contain an alphanumeric value used to identify the device. Plug-and-play manager 608 can read the value and check configuration file 606 to determine what driver should be loaded for the device. In this example, configuration file 606 can include information identifying the location of cap driver 514 in association with the hardware identifier. Plug-and-play manager 608 can locate cap driver 514 in storage device 106 and load it into operating system 602. In a specific example, BMC 502 and/or GPU 510 could be compliant with the peripheral component interface. When the computer system 406 starts, the registers of BMC 502 and GPU 510 can be mapped into the memory mapped address space of the computer system. This way the processor instructions used to access random access memory can also be used to access devices.

Turning to operation 1116, it shows loading the second driver based on a device class identifier stored in a register of the graphics processing unit in response to determining that a hardware identifier is not present in a configuration file. Similar to the preceding example, plug-and-play manager 608 can be configured to enumerate devices attached to the mainboard and check registers of GPU 510 to obtain the hardware device identifier and use it to search a configuration file. In this example, however, the device identifier for GPU 510 may not be present in configuration file 606. In response to determining that the device identifier is not present, plug-and-play manager 608 can be configured to search for a class identifier for the legacy GPU 510 in configuration file 606. In this example, plug-and-play manager 60 can fine the class identifier for GPU 510 in association with location of cap driver 514 and load cap driver 514.

Continuing with the description of FIG. 11, operation 1118 shows loading the second driver, wherein the second driver is configured to response to an initialization request with information that indicates that it meets the minimum requirements for controlling the graphics processing unit. Turning to FIG. 6 in conjunction with FIG. 11, cap driver 514 may be incapable of actually controlling GPU 510. However, since other techniques can be used to remote into computer systems during the runtime execution of its operating system or virtualization platform, GPU 510 may not be needed. In this example, cap driver 514 can be configured to respond to initialization requests from 3D graphics API 604 that indicates that cap driver 514 satisfies a minimum set of requirements rather than to respond with its actual capabilities. For example, cap driver 514 could respond with information that indicates that it implements device driver interfaces used to invoke 3D hardware functions of graphics processing units. In a specific example, cap driver 514 may be configured to respond with information that indicates that it implements interfaces for at least the Direct3D 9Ex runtime.

Referring briefly back to FIG. 11, operation 1120 shows that in an exemplary embodiment, the computer system can include circuitry for loading the second driver, wherein the second driver is configured to emulate the completion of graphics commands issued by a graphics application program interface. Similar to operation 1118, cap driver 514 can be configured to emulate the completion of commands issued by 3D graphics API 604. In this example, 3D graphics API 604 may issue commands during an initialization process and if the requests succeed then 3D graphics API 604 can allow cap driver 514 to be used for GPU 410; otherwise, an error is reported and basic graphics driver 518 may be loaded. In this example, cap driver 514 can be configured to respond to 3D graphics API 604 commands with information that indicates that the operations are successful. For example, cap driver 514 can be programmed to report that GPU 510 successfully completed certain operations to 3D graphics API 604.

Continuing with the description of FIG. 11, operation 1122 shows that in an embodiment, the computer system can include circuitry for executing a virtual machine, wherein the virtual machine is configured to render 3D graphics on the graphics processing unit via the third driver. Referring to FIG. 7, in an exemplary embodiment computer system 406 can include components operable host multiple 3D enabled virtual machines. In this example, the 3D graphical user interface being sent to a client can be for a virtual machine such as virtual machine 814. In this example, when 3D application 716, e.g., a graphical user interface for guest operating system 716, generates commands for 3D graphics, user mode graphics driver 710 (running guest operating system 220) can generate DMA buffers of primitives and commands and virtual device driver 712 can send them via graphics aperture 818 to graphics rendering module 806. Graphics rendering module 806 can route the DMA buffers to user mode 3D graphics driver 710 and issue a command to 3D graphics API 604 in virtualization platform 602 to 3D graphics driver 512. 3D graphics driver 512 can receive the command and append the DMA buffers to a queue. Graphics kernel 708 can issue an execute command and 3D graphics driver 512 can send the DMA buffers to 3D GPU 112. A bitmap can be generated by 3D GPU 112, which can be routed back to remote presentation engine 722. Remote presentation 722 can receive the bitmap and send it to the client corresponding to virtual machine 814, e.g., client 720.

Figure 12:
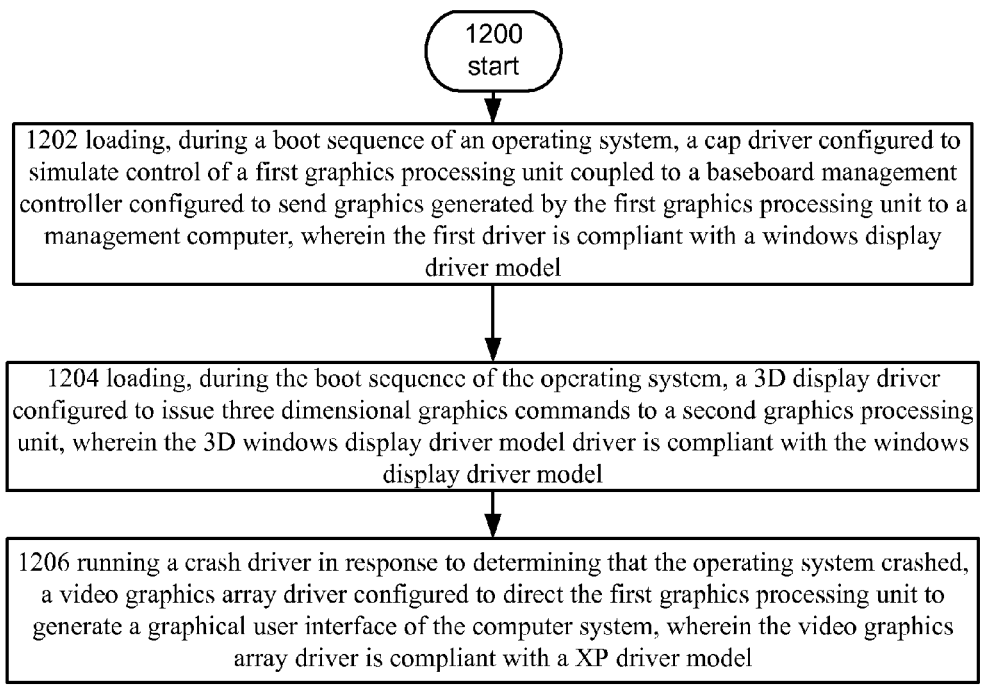
FIG. 12 depicts an operational procedure.

Turning now to FIG. 12, it shows an operational procedure for configuring a computer to enable 3D graphics capabilities while using a baseboard management controller. As shown by the figure, the operational procedure starts with operation 1200 and moves to operation 1202, which illustrates loading, during a boot sequence of an operating system, a cap driver configured to simulate control of a first graphics processing unit coupled to a baseboard management controller configured to send graphics generated by the first graphics processing unit to a management computer, wherein the first driver is compliant with a windows display driver model. Turning again to FIG. 5, boot firmware 504 can load operating system boot loader 508 into memory and exit. Operating system boot loader 508 can load components of operating system 602 into memory such as a kernel, a hardware abstraction layer, plug-and-play manager 608, configuration file 606, e.g., a registry, etc.

Turning now to FIG. 6, operating system boot loader 508 can start loading certain drivers into memory and eventually load a kernel for an operating system, e.g., operating system 602. For example, the drivers loaded at this stage may be for a file system or other drivers required by operating system 602 before the remainder of the operating system can be loaded. After these drivers are loaded, operating system boot loader 508 can load other components of operating system 602 such as a kernel, a hardware abstraction layer, configuration file 606, e.g., a registry, etc., and eventually plug-and-play manager 608.

Plug-and-play manager 608 can be executed by processor 102 and the hardware attached to the mainboard can be enumerated. Plug-and-play manager 608 can search configuration file 606 for drivers that correspond to the enumerated hardware. In an exemplary embodiment, plug-and-play manager 608 can detect the presence of graphics processing unit 510 and look in configuration file 606 for the driver that corresponds to it. In this example, plug-and-play manager 608 may detect cap driver 514 (i.e., a driver compliant with the WDDM) and basic graphics driver 518 (i.e., a driver compliant with the XPDM) as two drivers that can work with GPU 510. Configuration file 606, however, can include information that explicitly directs plug-and-play manager 608 to load cap driver 514 rather than base graphics driver 518.

Referring back to FIG. 12, operation 1204 shows that in an embodiment the computer system can include circuitry for loading, during the boot sequence of the operating system, a 3D display driver configured to issue three dimensional graphics commands to a second graphics processing unit, wherein the 3D windows display driver model driver is compliant with the windows display driver model. Referring back to FIG. 6, plug-and-play manager 608 can also load a graphics device driver for 3D GPU 112 that is compliant with the WDDM, into operating system 602. For example, plug-and-play manager 608 can check configuration file 604 and find information indicating that 3D graphics driver 516 and its corresponding user mode 3D graphics driver 516 are used for 3D GPU 112 and load them from storage device 106 into operating system 602.

Returning briefly to FIG. 12, operation 1206 shows running a crash driver in response to determining that the operating system crashed, a video graphics array driver configured to direct the first graphics processing unit to generate a graphical user interface of the computer system, wherein the video graphics array driver is compliant with a XP driver model. For example, and referring to FIG. 8, in an exemplary embodiment operating system 602 may crash and crash graphics driver 904, which may be a video graphics array (VGA) legacy diver, can execute on processor 102 and send commands to GPU 510 to direct it to generate a graphical user interface that includes text showing an error code and/or information explaining that operating system 602 has encountered an error and has shut down. Baseboard management controller 502 can be configured to capture the graphical user interface generated by GPU 510 and send it to management computer system 402 via a network interface card.

Figure 13:
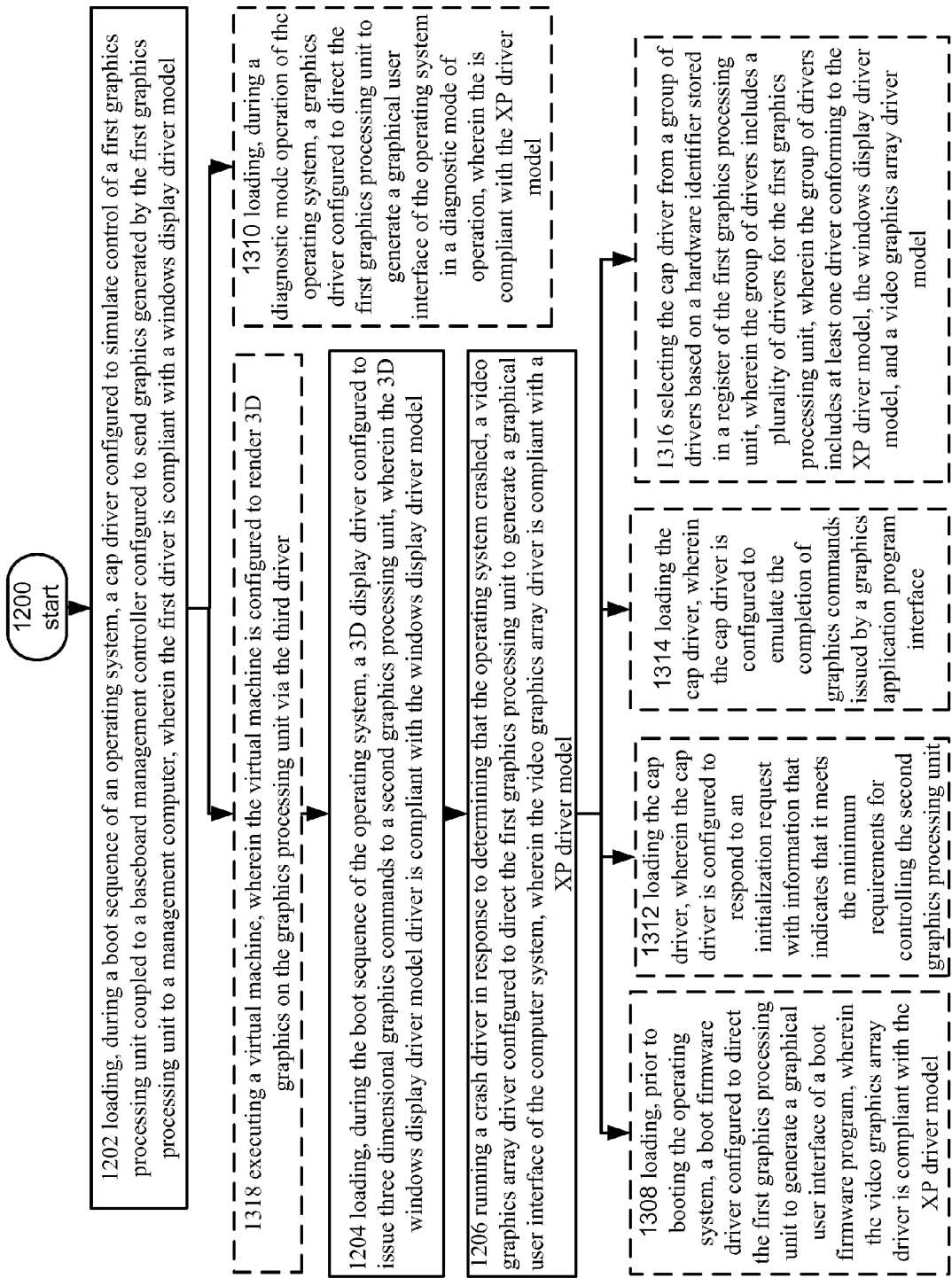
FIG. 13 illustrates the operational procedure of FIG. 12 including additional operations.

Referring now to FIG. 13, it shows additional operations that can be executed in conjunction with those illustrated above with respect to FIG. 12. For example, operation 1308 shows that in an embodiment the computer system can also include circuitry for loading, prior to booting the operating system, a boot firmware driver configured to direct the first graphics processing unit to generate a graphical user interface of a boot firmware program, wherein the video graphics array driver is compliant with the XP driver model. For example, and referring to FIG. 5, processor 102 can execute instructions that cause boot firmware display driver 504 (i.e., a legacy VGA driver) to be loaded into memory, e.g., random access memory. In this example, boot firmware display driver 504 can cause a graphics processing unit, e.g., GPU 510, to draw a bitmap indicative of the boot firmware's graphical user interface to memory. In this example, GPU 510 may be integrated with baseboard management controller 504 or operatively coupled to baseboard management controller 502, e.g., attached to a common bus, and baseboard management controller 502 can capture the graphical user interface generated by GPU 510 and send it to management computer system 402 of FIG. 4.

Continuing with the description of FIG. 13, operation 1310 shows that the computer system can include circuitry for loading, during a diagnostic mode operation of the operating system, a graphics driver configured to direct the first graphics processing unit to generate a graphical user interface of the operating system in a diagnostic mode of operation, wherein the is compliant with the XP driver model. As shown by the figure, in the instance that this operation is performed, a diagnostic mode of operation for operating system 602 may have been entered rather than the regular mode. In this example, plug-and-play manager 608 may be configured to load basic graphics driver 518, which may be a VGA driver, instead of cap driver 514 to enable use of GPU 510. In this example, advanced graphics capabilities may be unnecessary and 3D graphics driver 512 may not be needed. Thus, an operating system conflict will not exist in this scenario. In this example, configuration file 606 can include information that directs plug-and-play manager 608 to load basic graphics driver 518 for 3D GPU 112 and GPU 510 instead of cap driver 514 and 3D Graphics driver 512. Thus, while in diagnostic mode, baseboard management controller 502 can capture the graphical user interface generated by GPU 510 and send it to management computer system 402.

Referring now to operation 1312, it shows loading the cap driver, wherein the cap driver is configured to respond to an initialization request with information that indicates that it meets the minimum requirements for controlling the second graphics processing unit. Turning to FIG. 6 in conjunction with FIG. 11, cap driver 514 may be incapable of actually controlling GPU 510. However, since other techniques can be used to remote into computer systems during the runtime execution of its operating system or virtualization platform, GPU 510 may not be needed. In this example, cap driver 514 can be configured to respond to initialization requests from 3D graphics API 604 that indicates that cap driver 514 satisfies a minimum set of requirements rather than to respond with its actual capabilities. For example, cap driver 514 could respond with information that indicates that it implements device driver interfaces used to invoke 3D hardware functions of graphics processing units. In a specific example, cap driver 514 may be configured to respond with information that indicates that it implements interfaces for at least the Direct3D 9Ex runtime.

Continuing with the description of FIG. 13, it also shows operation 1314, which depicts loading the cap driver, wherein the cap driver is configured to emulate the completion of graphics commands issued by a graphics application program interface Cap driver 514 can be configured to emulate the completion of commands issued by 3D graphics API 604 in this example. In this example, 3D graphics API 604 may issue commands during an initialization process and if the requests succeed then 3D graphics API 604 can allow cap driver 514 to be used for GPU 510; otherwise, an error is reported and basic graphics driver 518 may be loaded. In this example, cap driver 514 can be configured to respond to 3D graphics API 604 commands with information that indicates that the operations are successful. For example, cap driver 514 can be programmed to report that GPU 510 successfully completed certain operations to 3D graphics API 604.

Referring to operation 1316, it shows selecting the cap driver from a group of drivers based on a hardware identifier stored in a register of the first graphics processing unit, wherein the group of drivers includes a plurality of drivers for the first graphics processing unit, wherein the group of drivers includes at least one driver conforming to the XP driver model, the windows display driver model, and a video graphics array driver model. For example, and referring again to FIG. 6, in an embodiment storage device 106 can include a group of display drivers that can be used to control GPU 510. For example, the group can include, but is not limited to, cap driver 514, basic graphics driver 518, or a third party graphics driver that is compliant with the legacy driver model, a legacy driver created by the hardware manufacturer of the baseboard management controller 502, etc. In this example, plug-and-play manager 608 can be configured to select cap driver 514 out of the group to load into operating system 602 based on information in a configuration file, e.g., the registry, that indicates that cap driver 514 should be loaded instead of any of these other drivers.

Again referring to FIG. 13, operation 1318 shows executing a virtual machine, wherein the virtual machine is configured to render 3D graphics on the graphics processing unit via the 3D display driver. Referring to FIG. 7, in an exemplary embodiment computer system 406 can include components operable to host multiple 3D enabled virtual machines. In this example, the 3D graphical user interface being sent to a client can be for a virtual machine such as virtual machine 814.

Figure 14:
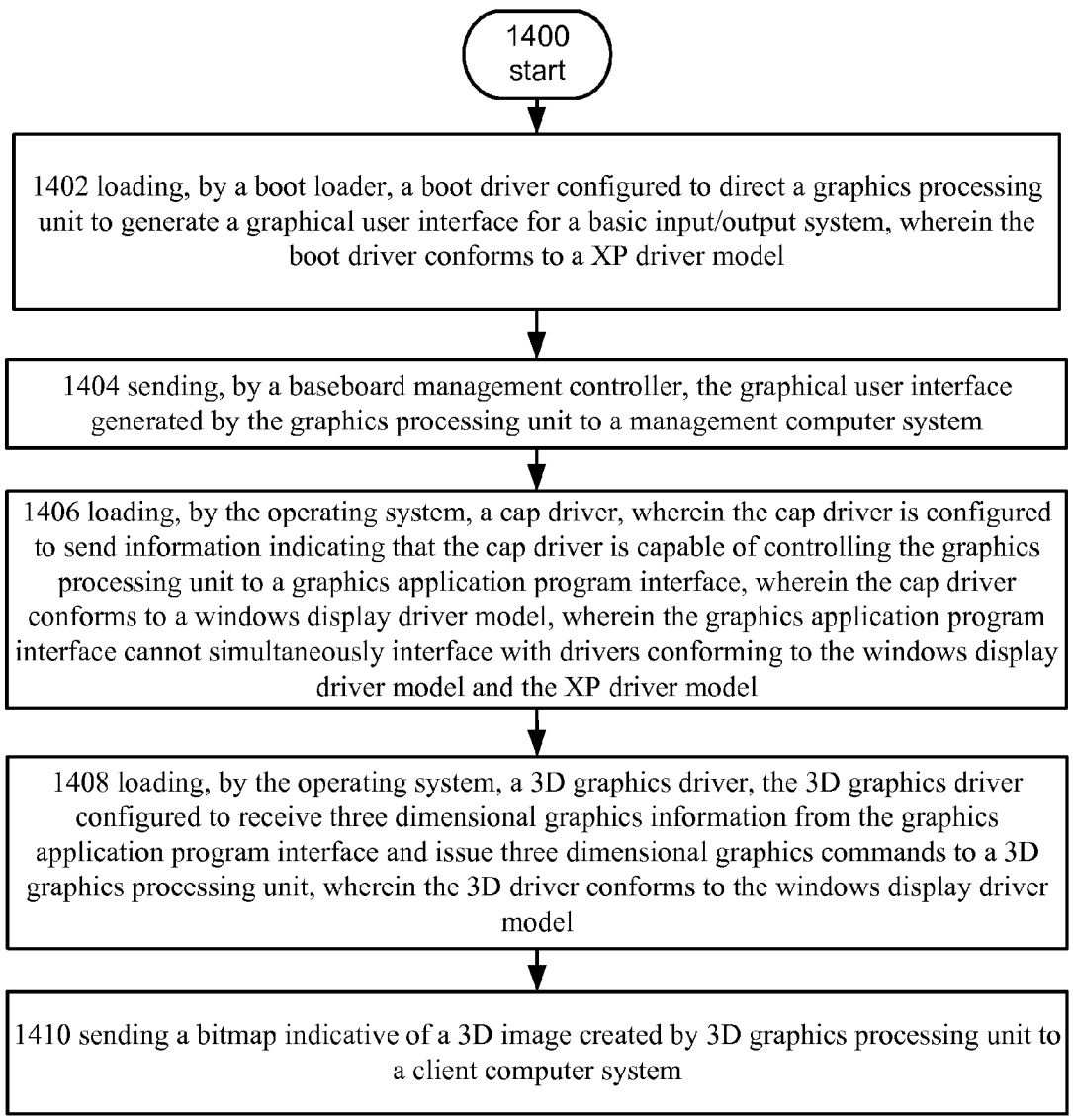
FIG. 14 depicts an operational procedure.

Referring now to FIG. 14, it shows an operational procedure for removing an operating system driver conflict including operations 1400, 1402, 1404, 1406, and 1408. As shown by FIG. 14, the operational procedure beings with operation 1400 and operation 1402 shows loading, by a boot loader, a boot driver configured to direct a graphics processing unit to generate a graphical user interface for a basic input/output system, wherein the boot driver conforms to a XP driver model. For example, and referring to FIG. 5, before operating system 602 is loaded, processor 102 can execute instructions that cause a VGA graphics driver to load in memory, e.g., random access memory. In a specific example, the VGA graphics driver can be firmware display driver 506. Boot firmware display driver 506 can be compliant with the XP driver model, e.g., a legacy driver model, and can issue commands to GPU 510 and/or 3D GPU 112 to draw a graphical user interface indicative of boot firmware 504, e.g., a basic input/output system.

Continuing with the description of FIG. 14, operation 1404 shows sending, by a baseboard management controller, the graphical user interface generated by the graphics processing unit to a management computer system. Turning back to FIG. 5, baseboard management controller 502 can include GPU 510 or be connected to GPU 510. As GPU 510 generates a graphical user interface for the BIOS, baseboard management controller 502 can capture the bitmap and send it in one or more packets to management computer system 402. An administrator operating management computer system 402 can use management program 404 to view the graphical user interface of the BIOS.

Turning back to FIG. 14, operation 1406 shows loading the cap driver, wherein the cap driver is configured to emulate the completion of graphics commands issued by the graphics application program interface. Referring back to FIG. 6, the BIOS may load an operating system boot loader 508 into random access memory. Operating system boot loader 508 can start loading certain drivers into memory eventually plug-and-play manager 608 can be loaded into operating system 602. Plug-and-play manager 608 may detect cap driver 514 and basic graphics driver 518 as two drivers that can work with GPU 510. In this example, a configuration file can include information that explicitly directs plug-and-play manager 608 to load cap driver 514. Cap driver 514 can also be configured to respond to initialization requests with predetermined information that indicates that cap driver 514 satisfies a minimum set of requirements instead of responding with its actual capabilities.

Continuing with the description of FIG. 14, operation 1408 shows loading, by the operating system, a 3D graphics driver, the 3D graphics driver configured to receive three dimensional graphics information from the graphics application program interface and issue three dimensional graphics commands to a 3D graphics processing unit, wherein the 3D driver conforms to the windows display driver model. Turning back to FIG. 6, plug-and-play manager 608 can continue loading drivers for hardware attached to the mainboard of computer system 406 and also load 3D graphics driver 512, which is also optimized for use with 3D graphics API 604. For example, plug-and-play manager 608 can check a configuration file and find information indicating that 3D graphics driver 512 and its corresponding user mode 3D graphics driver 516 are used for 3D GPU 112 and load them from storage device 106 into operating system 602.

Turning back to FIG. 13, it also includes operation 1410, which shows sending a bitmap indicative of a 3D image created by 3D graphics processing unit to a client computer system. For example, and referring to FIG. 6, after operating system 602 is up and running, a 3D graphical user interface created by 3D GPU 112 can be sent to a client such as client 620. For example, 3D application 704, e.g., a videogame, can be executed by operating system 602 and it can issue commands to 3D graphics API 604. 3D graphics API 604 can interface with user mode 3D graphics driver 516 and can generate DMA buffers of primitives and send them to 3D graphics driver 512, which can append the DMA buffers to a queue. Graphics kernel 610 can issue an execute command and 3D graphics driver 512 can send the DMA buffers to 3D GPU 112. A bitmap can be generated by 3D GPU 112, which can be sent to the client 620.

Referring to FIG. 15, it shows an alternative embodiment of the operational procedure illustrated by FIG. 15 including additional operations 1512-1518. Operation 1512 shows that in an exemplary embodiment, the operational procedure can include running a crash graphics driver configured to direct the graphics processing unit to generate a graphical user interface in response to determining that the operating system crashed. For example, and referring to FIG. 9, operating system 602 may crash and crash graphics driver 904 may execute on processor 102 and send commands to GPU 112 and GPU 510 to direct it to generate a graphical user interface that includes text showing an error code and/or information explaining that the operating system has encountered an error and has shut down. In this exemplary embodiment, the crash graphics driver 904 may be a VGA driver. Baseboard management controller 502 can be configured to capture the graphical user interface generated by GPU 510 and send it to management computer system 402 via a network interface card.

Turning to operation 1514, it shows loading the cap driver, wherein the cap driver is configured to emulate the completion of graphics commands issued by the graphics application program interface. Cap driver 514 can be configured to emulate the completion of commands issued by 3D graphics API 604 in this example. In this example, cap driver 514 can be configured to respond to 3D graphics API 604 commands with information that indicates that operations are successful, e.g., cap driver 514 can be configured to indicate that requests to render images were successfully completed instead of actually sending the commands to GPU 510.

Referring to operation 1516, it shows selecting, by the operating system, the cap graphics driver from a group of drivers based on a hardware identifier stored in a register of the graphics processing unit, wherein the group of drivers includes a plurality of drivers for the graphics processing unit, wherein the group of drivers includes at least one driver conforming to the windows display driver model and at least one driver conforming to the XP driver model. For example, and referring again to FIG. 6, in an embodiment storage device 106 can include a group of display drivers that can be used to control GPU 510. For example, the group can include, but is not limited to, cap driver 514, basic graphics driver 518, or a third party graphics driver that is compliant with the legacy driver model, a legacy driver created by the hardware manufacturer of the baseboard management controller 502, etc. In this example, plug-and-play manager 608 can be configured to select cap driver 514 out of the group to load into operating system 602 based on information in a configuration file, e.g., the registry, that indicates that cap driver 514 should be loaded instead of any of these other drivers.

Turning now to operation 1518, it shows executing a virtual machine, wherein the virtual machine is configured to render 3D graphics on the graphics processing unit via the 3D driver. Referring to FIG. 7, in an exemplary embodiment computer system 406 can include components operable to host multiple 3D enabled virtual machines. In this example, the 3D graphical user interface being sent to a client can be for a virtual machine such as virtual machine 814.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer system, comprising:
 a processor;
 a 3D graphics processing unit;
 a controller coupled to a graphics processing unit, the controller configured to send a graphical user interface generated by the graphics processing unit to a management computer system; and
 a memory configured to communicate with the processor, the graphics processing unit, the 3D graphics processing unit, and the controller when powered, the memory including instructions that upon execution cause the computer system to:
  load, prior to booting an operating system, a first driver configured to control the graphics processing unit, wherein the first driver is compliant with a first graphics driver model;
  load, during a boot sequence of the operating system, a second driver into the operating system, wherein the second driver is configured to simulate control of the graphics processing unit, wherein simulating control of the graphics processing unit comprises reporting completion of requests to control the graphics processing unit without sending requests to the graphics processing unit, wherein the second driver is compliant with a second graphics driver model, wherein the operating system cannot simultaneously run graphics drivers that are compliant with the first graphics driver model and the second graphics driver model;
  load, during the boot sequence of the operating system, a third driver configured to issue three dimensional graphics commands to the 3D graphics processing unit into the operating system, wherein the third driver is compliant with the second graphics driver model; and
  send 3D images generated by the 3D graphics processing unit to a client.

2. The computer system of claim 1, wherein the memory further comprises instructions that upon execution cause the computer system to:
  run a fourth driver configured to control the graphics processing unit in response to determining that the operating system crashed, wherein the fourth driver is compliant with the first graphics driver model.

3. The computer system of claim 1, wherein the memory further comprises instructions that upon execution cause the computer system to:
  run a fourth driver configured to control the graphics processing unit in response to determining that the operating system entered a diagnostic mode of operation, wherein the fourth driver is compliant with the first graphics driver model.

4. The computer system of claim 1, wherein the instructions that upon execution cause the computer system to load the second driver further comprise instructions that upon execution cause the computer system to:
  load the second driver based on a hardware identifier stored in a register of the graphics processing unit.

5. The computer system of claim 1, wherein the instructions that upon execution cause the computer system to load the second driver further comprise instructions that upon execution cause the computer system to:
  load the second driver based on a device class identifier stored in a register of the graphics processing unit in response to determining that a hardware identifier is not present in a configuration file.

6. The computer system of claim 1, wherein the instructions that upon execution cause the computer system to load the second driver further comprise instructions that upon execution cause the computer system to:
  load the second driver, wherein the second driver is configured to respond to an initialization request with information that indicates that it meets minimum requirements for controlling the graphics processing unit.

7. The computer system of claim 1, wherein the memory further comprises instructions that upon execution cause the computer system to:
  emulate completion of graphics commands issued by a graphics application program interface.

8. The computer system of claim 1, wherein the memory further comprises instructions that upon execution cause the computer system to:
  execute a virtual machine, wherein the virtual machine is configured to render 3D graphics on the graphics processing unit via the third driver.

9. A computer-readable storage device including instructions that upon execution by a processor cause a computer system to:
  load, during a boot sequence of an operating system, a first driver configured to simulate control of a first graphics processing unit coupled to a baseboard management controller configured to send graphics generated by the first graphics processing unit, wherein the first driver is compliant with a first driver model, wherein simulating control of the first graphics processing unit comprises reporting completion of requests to control the first graphics processing unit without sending requests to the first graphics processing unit;
  load, during the boot sequence of the operating system, an additional display driver configured to issue three dimensional graphics commands to a second graphics processing unit, wherein the additional display driver is compliant with the first driver model; and
  in response to determining that the operating system crashed, cause a second driver to direct the first graphics processing unit to generate a graphical user interface of the computer system, wherein the second driver is compliant with a second driver model.

10. The computer-readable storage device of claim 9, further comprising instructions that upon execution by the processor cause the computer system to:
  load, prior to booting the operating system, a boot firmware driver configured to direct the first graphics processing unit to generate a graphical user interface of a boot firmware program, wherein the second driver is compliant with the second driver model.

11. The computer-readable storage device of claim 9, further comprising instructions that upon execution by the processor cause the computer system to:
  load, during a diagnostic mode operation of the operating system, a graphics driver configured to direct the first graphics processing unit to generate a graphical user interface of the operating system in a diagnostic mode of operation, wherein the graphics driver is compliant with the second driver model.

12. The computer-readable storage device of claim 9, further comprising instructions that upon execution by the processor cause the computer system to:
  load the first driver, wherein the first driver is configured to respond to an initialization request with information that indicates that it meets minimum requirements for controlling the second graphics processing unit.

13. The computer-readable storage device of claim 9, further comprising instructions that upon execution by the processor cause the computer system to:
  load the first driver, wherein the first driver is configured to emulate completion of graphics commands issued by a graphics application program interface.

14. The computer-readable storage device of claim 9, further comprising instructions that upon execution by the processor cause the computer system to:
  select the first driver from a group of drivers based on a hardware identifier stored in a register of the first graphics processing unit, wherein the group of drivers includes a plurality of drivers for the first graphics processing unit, wherein the group of drivers includes at least one driver conforming to the second driver model and at least one driver conforming to the first driver model.

15. The computer-readable storage device of claim 9, further comprising instructions that upon execution by the processor cause the computer system to:
  execute a virtual machine, wherein the virtual machine is configured to render 3D graphics on the graphics processing unit via the additional display driver.

16. A computer implemented method, comprising:
  loading, by a computer, a first driver, wherein the first driver is configured to send information indicating that the first driver is capable of controlling a graphics processing unit to a graphics application program interface, wherein the first driver conforms to a first driver model, wherein the graphics application program interface cannot simultaneously interface with drivers conforming to the first driver model and a second driver model;
  loading, by the computer, a boot driver configured to direct a graphics processing unit of a controller to generate a graphical user interface for a basic input/output system, wherein the boot driver conforms to the second driver model;

loading, by the computer, an additional driver, the additional graphics driver configured to receive three dimensional graphics information from the graphics application program interface and issue three dimensional graphics commands to a 3D graphics processing unit, wherein the additional driver conforms to the first driver model;

sending a bitmap indicative of a 3D image created by 3D graphics processing unit to a client computer system emulating, by the first driver while the additional driver is loaded, completion of 3D graphics commands for generating a 3D graphical user interface; and transmitting the 3D graphical user interface generated by the graphics processing unit.

17. The method of claim 16, further comprising:

running a crash graphics driver configured to direct the graphics processing unit to generate a graphical user interface in response to determining that an operating system of the computer has crashed.

18. The method of claim 16, further comprising:

selecting, by an operating system of the computer, the first driver from a group of drivers based on a hardware identifier stored in a register of the graphics processing unit, wherein the group of drivers includes a plurality of drivers for the graphics processing unit, wherein the group of drivers includes at least one driver conforming to the first driver model and at least one driver conforming to the second driver model.

19. The method of claim 16, further comprising:

executing a virtual machine, wherein the virtual machine is configured to render 3D graphics on the graphics processing unit via the additional driver.

* * * * *